(12) United States Patent
Kim et al.

(10) Patent No.: US 10,770,065 B2
(45) Date of Patent: Sep. 8, 2020

(54) SPEECH RECOGNITION METHOD AND APPARATUS

(71) Applicant: Samsung Electronics Co., Ltd., Suwon-si, Gyeonggi-do (KR)

(72) Inventors: Sang-yoon Kim, Seoul (KR); Sung-soo Kim, Yongin-si (KR); Il-hwan Kim, Yeongcheon-si (KR); Kyung-min Lee, Suwon-si (KR); Nam-hoon Kim, Seongnam-si (KR); Jong-youb Ryu, Hwaseong-si (KR); Jae-won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 15/842,430

(22) Filed: Dec. 14, 2017

(65) Prior Publication Data
US 2018/0174580 A1    Jun. 21, 2018

(30) Foreign Application Priority Data

Dec. 19, 2016   (KR) ......................... 10-2016-0173618

(51) Int. Cl.
*G10L 15/197*    (2013.01)
*G10L 15/22*     (2006.01)
*G10L 15/30*     (2013.01)

(52) U.S. Cl.
CPC ............ *G10L 15/197* (2013.01); *G10L 15/22* (2013.01); *G10L 15/30* (2013.01); *G10L 2015/228* (2013.01)

(58) Field of Classification Search
CPC ........ G10L 15/285; G10L 15/30; G10L 15/34
See application file for complete search history.

(56) References Cited

U.S. PATENT DOCUMENTS

| | | | | |
|---|---|---|---|---|
| 5,899,973 | A * | 5/1999 | Bandara | G10L 15/197 704/238 |
| 9,530,416 | B2 * | 12/2016 | Stern | G10L 15/22 |
| 9,666,188 | B2 * | 5/2017 | Thomson | G10L 15/22 |
| 10,170,121 | B2 * | 1/2019 | Luddecke | G10L 15/30 |
| 10,181,321 | B2 * | 1/2019 | Miller | G10L 13/02 |
| 2001/0029453 | A1 * | 10/2001 | Klakow | G10L 15/063 704/257 |
| 2005/0177414 | A1 | 8/2005 | Priogin et al. | |
| 2007/0112567 | A1 | 5/2007 | Lau et al. | |

(Continued)

FOREIGN PATENT DOCUMENTS

KR    10-2010-0101986 A    9/2010

OTHER PUBLICATIONS

International Search Report dated Apr. 12, 2018, issued in International Patent Application No. PCT/KR2017/014683.

*Primary Examiner* — Brian L Albertalli
(74) *Attorney, Agent, or Firm* — Jefferson IP Law, LLP

(57) ABSTRACT

A speech recognition method and a speech recognition apparatus which pre-download a speech recognition model predicted to be used and use the speech recognition model in speech recognition is provided. The speech recognition method, performed by the speech recognition apparatus, includes determining a speech recognition model, based on user information downloading the speech recognition model, performing speech recognition, based on the speech recognition model, and outputting a result of performing the speech recognition.

21 Claims, 11 Drawing Sheets

(56) References Cited

U.S. PATENT DOCUMENTS

| | | | |
|---|---|---|---|
| 2007/0124134 A1* | 5/2007 | Van Kommer | G06Q 30/02 704/10 |
| 2008/0091435 A1 | 4/2008 | Strope et al. | |
| 2009/0271195 A1* | 10/2009 | Kitade | G10L 15/065 704/239 |
| 2010/0312555 A1 | 12/2010 | Plumpe et al. | |
| 2011/0015928 A1* | 1/2011 | Odell | G10L 15/30 704/257 |
| 2013/0030802 A1* | 1/2013 | Jia | G10L 15/06 704/231 |
| 2013/0085753 A1 | 4/2013 | Bringert et al. | |
| 2014/0108018 A1* | 4/2014 | Phillips | G06F 17/275 704/275 |
| 2014/0136214 A1* | 5/2014 | Winter | G10L 15/22 704/275 |
| 2014/0337007 A1 | 11/2014 | Waibel et al. | |
| 2015/0120287 A1 | 4/2015 | Stern et al. | |
| 2016/0379626 A1* | 12/2016 | Deisher | G10L 15/30 704/232 |

\* cited by examiner

FIG. 8
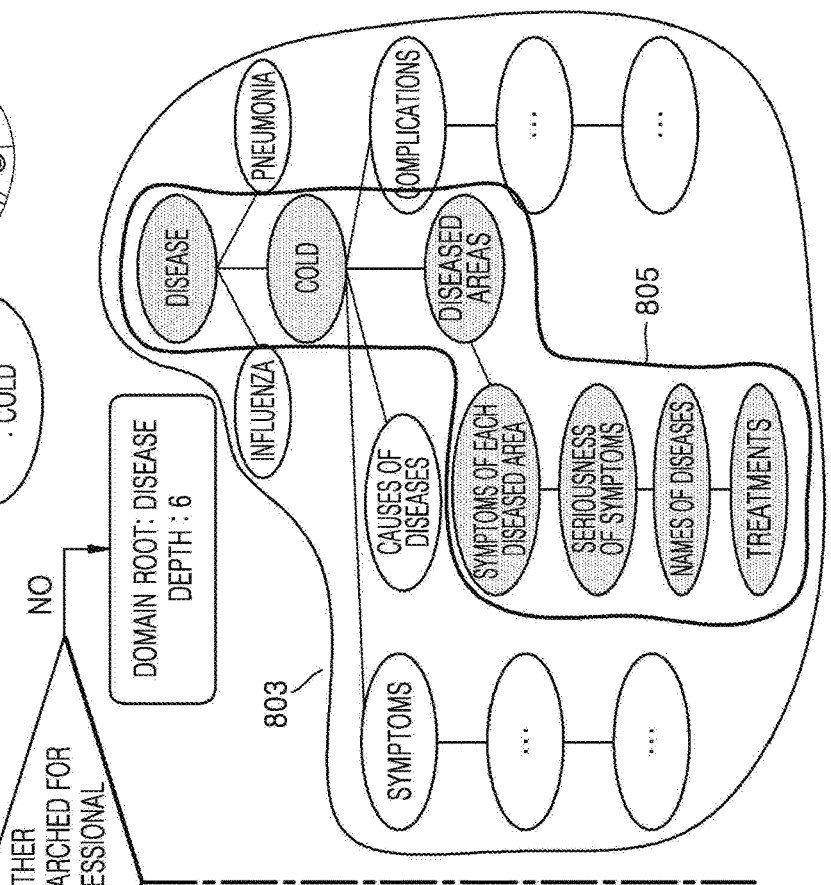
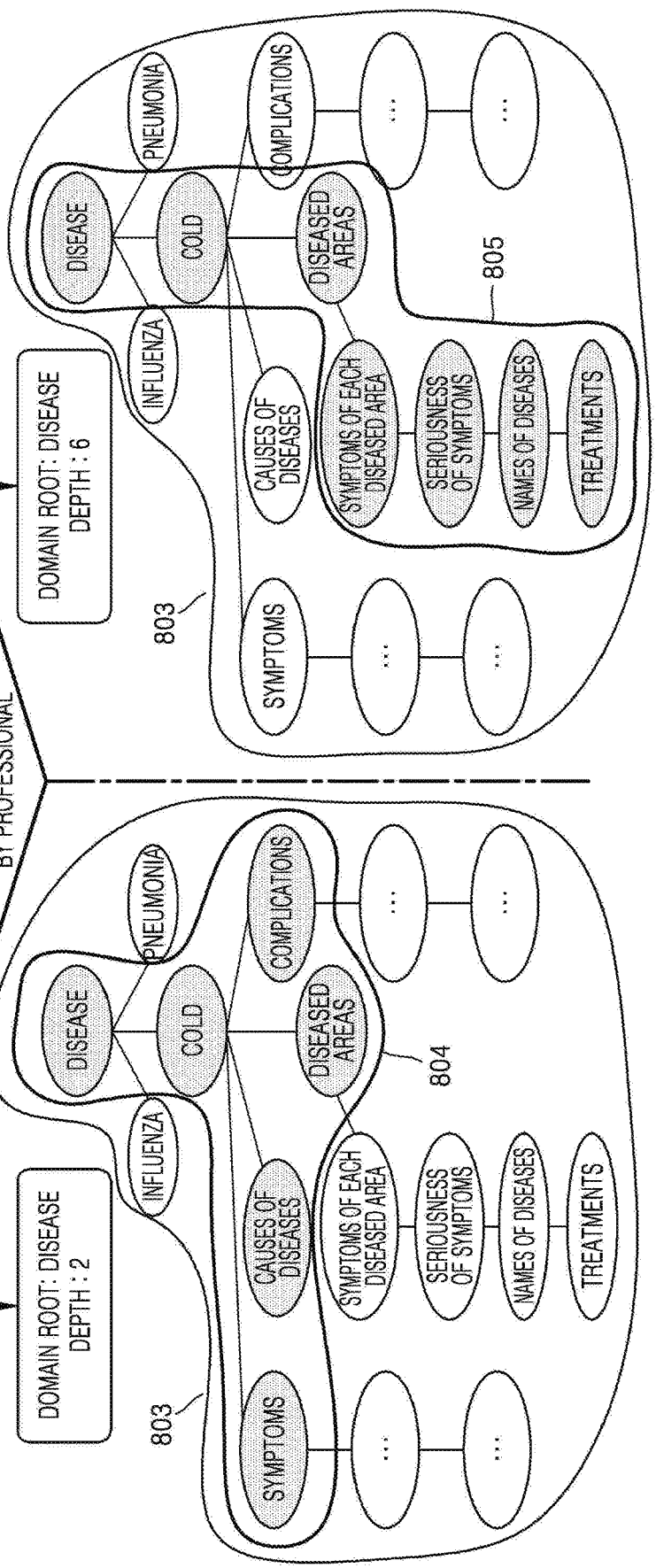
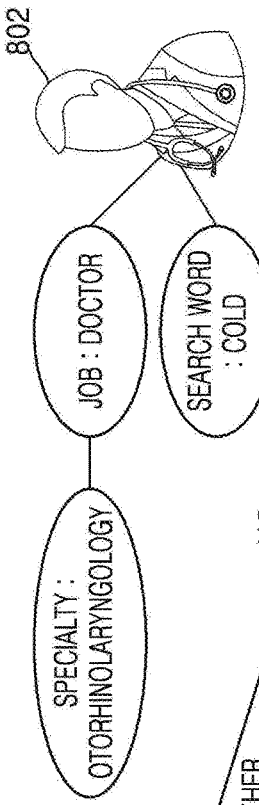
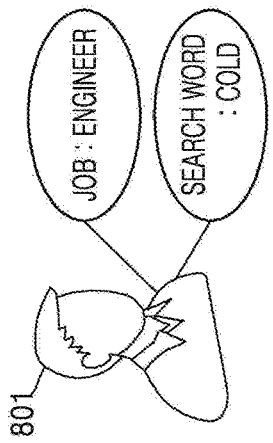

FIG. 11

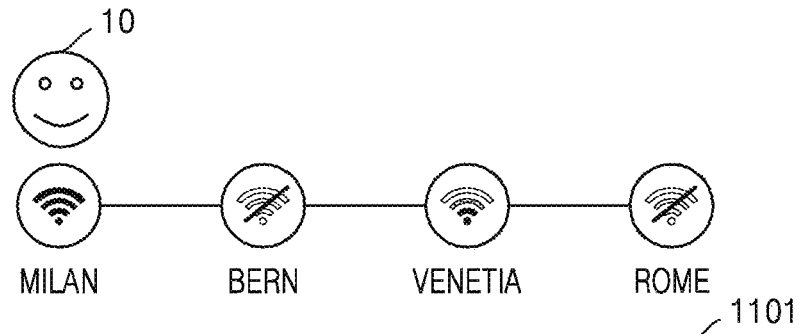

| LOCATION OF USER | STATUS OF NETWORK CONNECTION | STATUS OF MODEL MANAGER |
|---|---|---|
| MILAN | 100% | MILAN (SERVER ACTIVATED)<br>BERN (100% PRELIMINARY)<br>VENETIA (NON-POSSESSION)<br>ROME (50% PRELIMINARY) |
| BERN | 0% | MILAN (NON-POSSESSION)<br>BERN (EMBEDMENT ACTIVATED)<br>VENETIA (NON-POSSESSION)<br>ROME (50% PRELIMINARY) |
| VENETIA | 60% | MILAN (NON-POSSESSION)<br>BERN (DEACTIVATED)<br>VENETIA (SERVER ACTIVATED)<br>ROME (100% PRELIMINARY) |
| ROME | 0% | MILAN (NON-POSSESSION)<br>BERN (DEACTIVATED)<br>VENETIA (NON-POSSESSION)<br>ROME (EMBEDMENT ACTIVATED) |

FIG. 12

| | SMARTPHONE 1201 | NAVIGATION 1202 | SMART WATCH 1203 | VIRTUAL REALITY CAMERA 1204 |
|---|---|---|---|---|
| DOWNLOAD OR SHARE MODEL FROM OR WITH PERIPHERAL ELECTRONIC DEVICE | TURN ON/OFF POWER [CARDINAL NUMBER] / [ORDINAL NUMBER] ACTIVATE/CONNECT BLUETOOTH MODE [CARDINAL NUMBER] OFF IN [CARDINAL NUMBER] MINUTES 1211 | | | |
| | VOLUME [CARDINAL NUMBER] TURN UP/DOWN THE VOLUME REPRODUCE [ORDINAL NUMBER] RADIO CHANNEL 1213 | | | CHANGE TO SLEEP MODE BLACK BOX MODE ON 1215 |
| DOWNLOAD MODEL FROM SERVER | LANGUAGE MODELS RELATED TO PHONE NUMBER, MESSAGE TRANSLATION, ETC 1217 | LANGUAGE MODEL RELATED TO PLACE NAMES, GAS STATION INFORMATION, ROAD TRAFFIC STATUS, ETC. 1218 | LANGUAGE MODEL RELATED TO HEALTH SUCH AS HEART RATE, BLOOD PRESSURE, AMOUNT OF EXERCISE, ETC. 1219 | LANGUAGE MODEL RELATED TO CAMERA CONTROL SUCH AS EXPOSURE, SHUTTER, WHITE BALANCE, ETC. 1220 |

SPEECH RECOGNITION METHOD AND APPARATUS

CROSS-REFERENCE TO RELATED APPLICATION(S)

This application claims the benefit under 35 U.S.C. § 119(a) of a Korean patent application filed on Dec. 19, 2016 in the Korean Intellectual Property Office and assigned Serial number 10-2016-0173618, the entire disclosure of which is hereby incorporated by reference.

TECHNICAL FIELD

The present disclosure relates to a speech recognition method and apparatus. More particularly, the present disclosure relates to a speech recognition method of pre-downloading a speech recognition model predicted to be used and using the speech recognition model in speech recognition, and a speech recognition apparatus.

BACKGROUND

Recently, electronic devices such as smartphones that perform various functions have been developed, and electronic devices having a speech recognition function mounted therein to improve usability have been released. The speech recognition function is advantageous in that speech of a user is recognized without separate button control or having to contact a touch module so that the user can easily control a device.

According to the speech recognition function, for example, in a portable terminal such as a smartphone, a call function can be performed or a text message can be written without pressing a separate button, and various functions such as navigation, internet searching, alarm setting, etc. may be easily set.

For example, a speech recognition apparatus may include an embedded speech recognition apparatus that performs speech recognition by using a speech recognition model stored in a memory embedded in the speech recognition apparatus. Because the embedded speech recognition apparatus uses the speech recognition model stored in the memory in the embedded speech recognition apparatus, even if the speech recognition apparatus is not connected to a network, the speech recognition apparatus can perform speech recognition and has a fast response speed. However, the embedded speech recognition apparatus may recognize a limited range of speech recognition commands corresponding to the speech recognition model stored in the memory embedded in the speech recognition apparatus, and has a low recognition rate compared to a server-connected speech recognition apparatus.

As another example, the speech recognition apparatus may include a server-connected speech recognition apparatus that performs speech recognition by using a speech recognition model stored in a server connected to the speech recognition apparatus. Because the server-connected speech recognition apparatus uses a memory having a large storage capacity in the server, the server-connected speech recognition apparatus may recognize a large range of speech recognition commands and has a high recognition rate compared to the embedded speech recognition apparatus. However, the server-connected speech recognition apparatus can perform a speech recognition function only when the speech recognition apparatus is connected to a network.

As another example, in order to compensate for demerits of the embedded speech recognition apparatus and the server-connected speech recognition apparatus, a hybrid-type speech recognition apparatus may be used. When the hybrid-type speech recognition apparatus is connected to a network, the hybrid-type speech recognition apparatus may operate as the server-connected speech recognition apparatus, and when the hybrid-type speech recognition apparatus is not connected to the network, the hybrid-type speech recognition apparatus may operate as the embedded speech recognition apparatus.

When the hybrid-type speech recognition apparatus is connected to the network, the hybrid-type speech recognition apparatus performs speech recognition by using a speech recognition model downloaded from a server so that the hybrid-type speech recognition apparatus may recognize a large range of speech recognition commands or may have a high recognition rate compared to the embedded speech recognition apparatus. In addition, when the hybrid-type speech recognition apparatus is connected to the network, the hybrid-type speech recognition apparatus periodically updates a speech recognition model stored in a memory embedded in the speech recognition apparatus, thus, even if the hybrid-type speech recognition apparatus is not connected to the network, the hybrid-type speech recognition apparatus may recognize a large range of speech recognition commands or may have a high recognition rate compared to the embedded speech recognition apparatus. In addition, because the hybrid-type speech recognition apparatus changes its operation scheme according to network connection, even if the hybrid-type speech recognition apparatus is not connected to the network, the hybrid-type speech recognition apparatus can perform a speech recognition function, thereby overcoming the demerits of the server-connected speech recognition apparatus.

Other aspects, advantages, and salient features of the disclosure will become apparent to those skilled in the art from the following detailed description, which, taken in conjunction with the annexed drawings, discloses various embodiments of the present disclosure.

SUMMARY

When a speech recognition apparatus is not connected to a network, the speech recognition apparatus may perform speech recognition by using a speech recognition model stored in an embedded memory. When the speech recognition apparatus performs the speech recognition by using the speech recognition model stored in the embedded memory, if the previously-stored speech recognition model does not match with a speech recognition command uttered by a user, a speech recognition rate may deteriorate.

Aspects of the present disclosure are to address at least the above-mentioned problems and/or disadvantages and to provide at least the advantages described below. Accordingly, an aspect of the present disclosure is to provide a technique of maintaining an efficient speech recognition function, regardless of whether or not the speech recognition apparatus is connected to a network.

In accordance with an aspect of the present disclosure a speech recognition method performed by a speech recognition apparatus is provided. The speech recognition method includes determining a speech recognition model, based on user information, downloading the speech recognition model, performing speech recognition, based on the speech recognition model, and outputting a result of performing the speech recognition.

In accordance with an aspect of the present disclosure a speech recognition apparatus is provided. The speech recognition apparatus includes a receiver configured to receive speech of a user of the speech recognition apparatus, at least one processor configured to determine a speech recognition model, based on user information, and to perform speech recognition on the speech of the user, based on the speech recognition model, a communicator configured to download the speech recognition model, and an output interface configured to output a result of performing the speech recognition.

In accordance with an aspect of a non-transitory computer-readable recording medium having recorded thereon one or more programs is provided. The recording medium includes instructions for enabling an electronic apparatus to perform a speech recognition method including determining a speech recognition model, based on user information, downloading the speech recognition model, performing speech recognition, based on the speech recognition model, and outputting a result of performing the speech recognition.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a diagram for describing a method, performed by the speech recognition apparatus, of determining a range of language models included in a predictive language model, based on user information, according to an embodiment of the present disclosure;

FIG. 11 is a diagram for describing a method, performed by the speech recognition apparatus, of downloading a predictive language model by referring to a status of a network on a movement route, according to an embodiment of the present disclosure; and FIG. 12 is a diagram for describing a method, performed by the speech recognition apparatus, of downloading or sharing a language model from or with a peripheral electronic device, according to an embodiment of the present disclosure.

Throughout the drawings, it should be noted that like reference numbers are used to depict the same or similar elements, features, and structures.

DETAILED DESCRIPTION

Figure 1A:
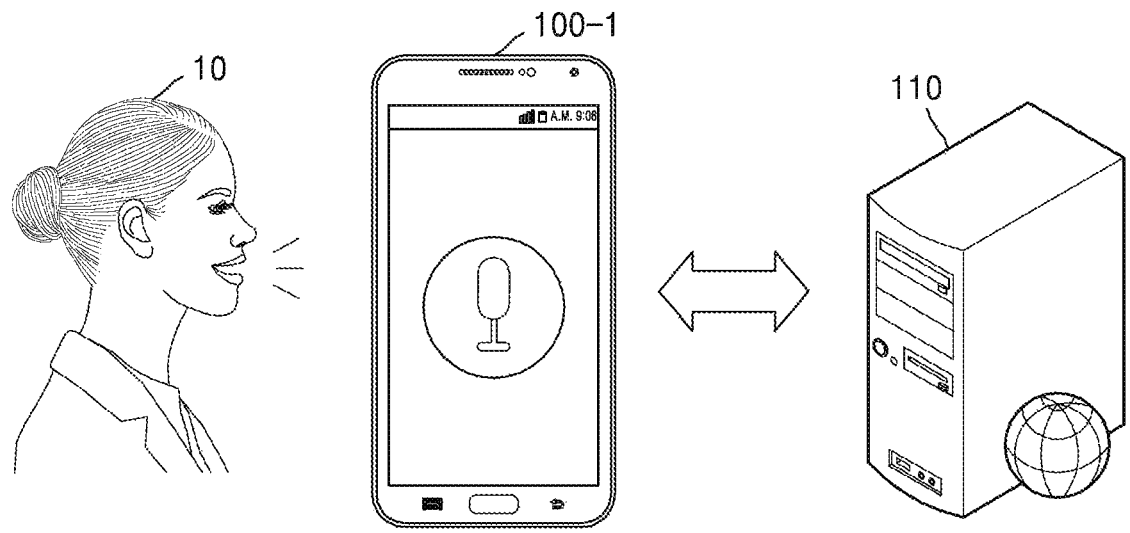
FIGS. 1A and 1B are drawings for describing a speech recognition system, according to an embodiment of the present disclosure.

The following description with reference to the accompanying drawings is provided to assist in comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Some embodiments may be described in terms of functional block components and various processing operations. Some or all of the functional blocks may be realized by any number of hardware and/or software components configured to perform the specified functions. For example, functional blocks of the present disclosure may be realized by one or more microprocessors, or circuit components for a predetermined function. In addition, for example, the functional blocks of the present disclosure may be implemented with any programming or scripting language. The functional blocks may be implemented in algorithms that execute on one or more processors. Furthermore, the present disclosure could employ any number of techniques for electronics configuration according to the related art, signal processing and/or control, data processing and the like.

Furthermore, connecting lines or connectors between elements shown in drawings are intended to represent various functional relationships and/or physical or logical couplings between the elements. It should be noted that many alternative or additional functional relationships, physical connections or logical connections may be present in a practical device.

As used herein, the term "and/or" includes any and all combinations of one or more of the associated listed items. Expressions such as "at least one of," when preceding a list of elements, modify the entire list of elements and do not modify the individual elements of the list.

Hereinafter, the present disclosure will now be described more fully with reference to the accompanying drawings.

Figure 1B:
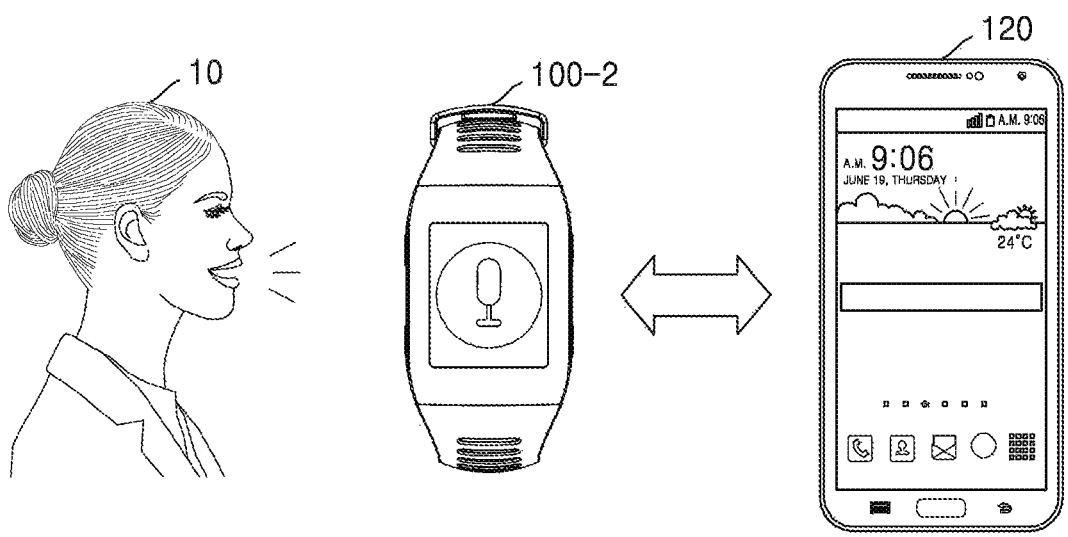

FIGS. 1A and 1B are drawings for describing a speech recognition system, according to an embodiment of the present disclosure.

Referring to FIG. 1A, the speech recognition system according to the present disclosure is not limited thereto embodiment may include a speech recognition apparatus 100-1 and a server 110. The speech recognition apparatus 100-1 and the server 110 may be connected in a wired or wireless manner.

For example, the speech recognition apparatus 100-1 may be a mobile computing apparatus or a non-mobile computing apparatus, which includes, but is not limited to, a smartphone, a tablet personal computer (PC), a PC, a smart television (TV), a personal digital assistant (PDA), a laptop, a media player, a microserver, a global positioning system (GPS) device, a wearable device, an electronic-book (e-book) terminal, a terminal for digital broadcasting, navigation, a kiosk, an Moving Picture Experts Group phase 1 or phase 2 (MPEG-1 or MPEG-2) audio layer 3 (MP3) player, a digital camera, an electronic control device of a vehicle, a central information display (CID), or the like. For example, the speech recognition apparatus 100-1 may be included in a smartphone, an electronic control device of a vehicle, or a CID.

The speech recognition apparatus 100-1 according to the present embodiment may receive an audio signal including speech uttered by a user 10, and may perform speech recognition on the speech in the audio signal. The speech recognition apparatus 100-1 may perform the speech recognition by using a speech recognition model downloaded from the server 110. The speech recognition apparatus 100-1 may output a result of the speech recognition.

The server 110 according to the present embodiment may share data with the speech recognition apparatus 100-1. The speech recognition apparatus 100-1 may transmit the input audio signal to the server 110. Alternatively, the speech recognition apparatus 100-1 may transmit a speech signal detected from the input audio signal to the server 110. Alternatively, the speech recognition apparatus 100-1 may transmit a feature of the speech signal detected from the input audio signal to the server 110.

The server 110 may perform speech recognition based on a signal received from the speech recognition apparatus 100-1. For example, the server 110 may perform the speech recognition on the speech signal detected from the audio signal that was input to the speech recognition apparatus 100-1. The server 110 may perform the speech recognition by using a speech recognition model stored in the server 110. The speech recognition apparatus 100-1 may perform the speech recognition by using the speech recognition model stored in the server 110. The server 110 may transmit a result of the speech recognition to the speech recognition apparatus 100-1. The speech recognition apparatus 100-1 may output the result of the speech recognition.

Referring to FIG. 1B, the speech recognition system may include a speech recognition apparatus 100-2 and an electronic device 120. The speech recognition apparatus 100-2 and the electronic device 120 may be connected in a wired or wireless manner. For example, the speech recognition apparatus 100-2 may be a mobile computing apparatus or a non-mobile computing apparatus, which includes a smartphone, a tablet PC, a PC, a smart TV, a PDA, a laptop, a media player, a microserver, a GPS device, a wearable device in a form of a wrist watch, a bracelet, glasses, a headphone, earphones, etc., an e-book terminal, a terminal for digital broadcasting, navigation, a kiosk, an MP3 player, a digital camera, an electronic control device of a vehicle, a CID, or the like. The electronic device 120 may be a mobile computing apparatus or a non-mobile computing apparatus, which includes a smartphone, a tablet PC, a PC, a smart TV, a PDA, a laptop, a media player, a microserver, a GPS device, a wearable device, an e-book terminal, a terminal for digital broadcasting, navigation, a kiosk, an MP3 player, a digital camera, an electronic control device of a vehicle, a CID, or the like.

The electronic device 120 according to the present embodiment may control an operation of the speech recognition apparatus 100-2, and may share data with the speech recognition apparatus 100-2.

The speech recognition apparatus 100-2 according to the present embodiment may receive an audio signal including speech uttered by the user 10, and may perform speech recognition on the speech in the audio signal. The speech recognition apparatus 100-2, according to the present embodiment may perform the speech recognition by using a speech recognition model downloaded from the electronic device 120 or shared with the electronic device 120 in real time. The speech recognition apparatus 100-2 may output a result of the speech recognition.

The speech recognition apparatus 100-2 may receive the audio signal including the speech uttered by the user 10, and may transmit the audio signal to the electronic device 120. Alternatively, the speech recognition apparatus 100-2 may receive the audio signal including the speech uttered by the user 10, and may transmit, to the electronic device 120, a speech signal detected from the received audio signal. Alternatively, the speech recognition apparatus 100-2 may receive the audio signal including the speech uttered by the user 10, and may transmit, to the electronic device 120, a feature of the speech signal which is detected from the received audio signal.

The electronic device 120 may perform speech recognition, based on a signal received from the speech recognition apparatus 100-2. For example, the electronic device 120 may perform speech recognition on the speech signal detected from the audio signal input to the speech recognition apparatus 100-2. The electronic device 120 may perform the speech recognition by using a speech recognition model stored in the electronic device 120. The speech recognition apparatus 100-2 according to the present embodiment may perform speech recognition by using the speech recognition model stored in the electronic device 120. The electronic device 120 may output a result of the speech recognition or may control the speech recognition apparatus 100-2 to output the result of the speech recognition.

The speech recognition apparatus 100-1 or 100-2 provides a method of maintaining a high speech recognition function even if the speech recognition apparatus 100-1 or 100-2 is not connected to the server 110 or the electronic device 120 according to a change in network circumstances.

When a speech recognition apparatus according to the related art is not connected to a network, the speech recognition apparatus may perform speech recognition by using a speech recognition model stored in an embedded memory. In this regard, if a circumstance reflected to the speech recognition model that was previously updated and stored in the speech recognition apparatus does not match a current circumstance, a speech recognition rate may deteriorate.

For example, when network connection is smooth, the speech recognition apparatus may download language models included in a specific domain to which new coinages or a user's usage history has been reflected, and may update a pre-stored language model. However, if a user does not give an utterance corresponding to the language models included in the specific domain, there is a high possibility that an error occurs in speech recognition. According to the present embodiment, a speech recognition method for maintaining a high speech recognition rate, regardless of network connection, is provided.

Figure 2:
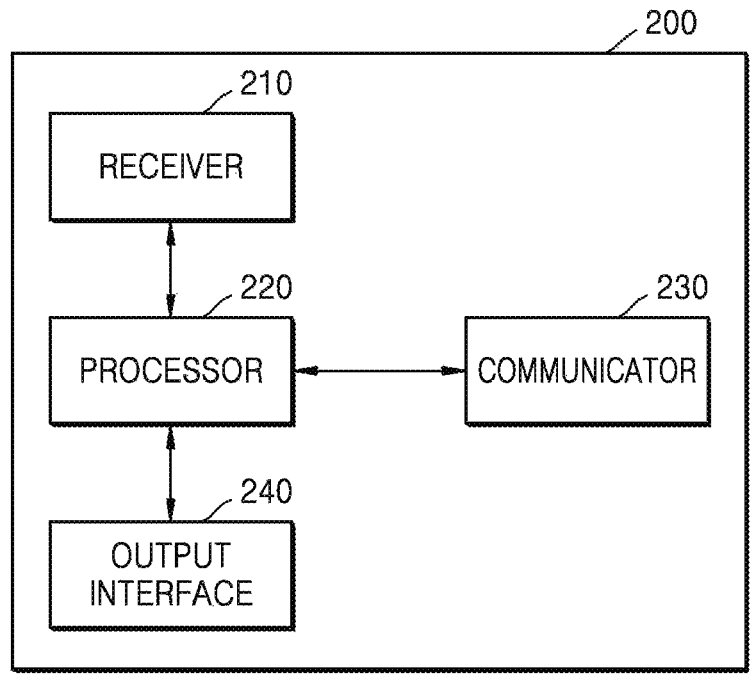
FIG. 2 is a block diagram of a speech recognition apparatus, according to an embodiment of the present disclosure.

FIG. 2 is a block diagram of a speech recognition apparatus 200, according to an embodiment of the present disclosure.

Figure 3:
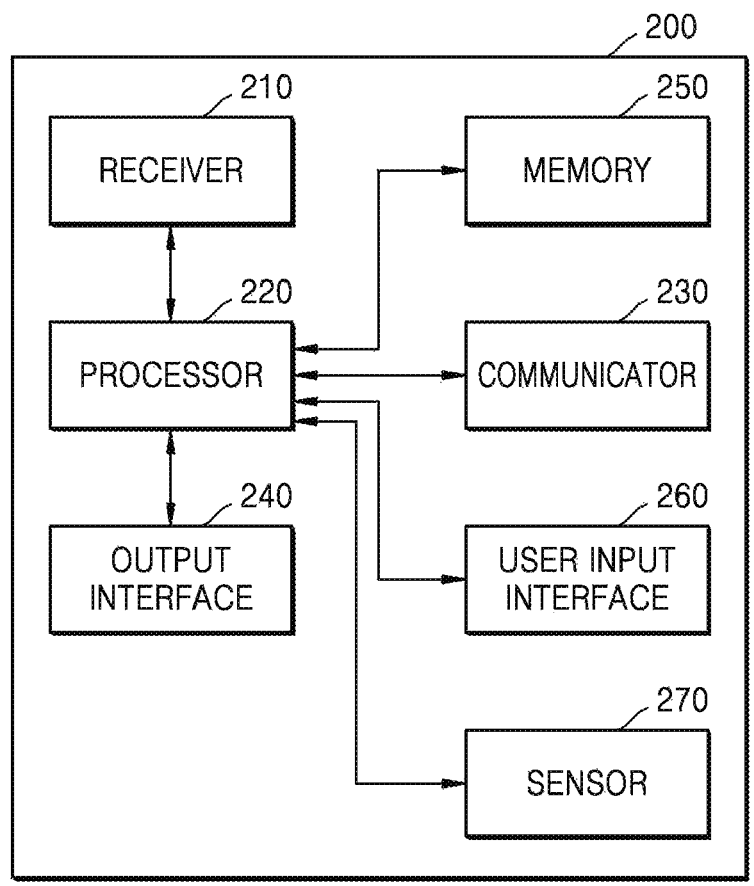
FIG. 3 is a block diagram of the speech recognition apparatus according to an embodiment of the present disclosure.

Referring to FIG. 2, the speech recognition apparatus 200 according to the present embodiment may include a receiver 210, a processor 220, a communicator 230, and an output interface 240. However, the speech recognition apparatus 200 may be embodied with more elements than the elements shown in FIG. 2. For example, as illustrated in FIG. 3, the speech recognition apparatus 200 receiver 210 may further include a memory 250, a user input interface 260, and a sensor 270.

For example, the speech recognition apparatus 200 may be embodied to be included in at least one of a home appliance, a vehicle electronic control device, and a computing device, or connected in a wired or wireless manner to at least one of the home appliance, the vehicle electronic control device, or the computing device.

The receiver 210 according to the present embodiment may receive an audio signal including speech of a user. For example, the receiver 210 may convert external sound input via a microphone into electro-acoustic data, thereby directly receiving the audio signal. Alternatively, the receiver 210 may receive an audio signal from an external device. Referring to FIG. 2, the receiver 210 is included in the speech recognition apparatus 200, but the receiver 210 according to another embodiment may be included in a separate device and may be connected to the speech recognition apparatus 200 in a wired or wireless manner.

The processor 220 according to the present embodiment may control general operations of the speech recognition apparatus 200. For example, the processor 220 may control the receiver 210, the communicator 230, and the output interface 240.

The processor 220 may determine a speech recognition model, based on user information.

The speech recognition model may include at least one of a pre-processing model, an acoustic model, or a language model.

The pre-processing model includes information used in a pre-process performed on an input audio signal before speech recognition is performed. For example, the pre-processing model may include information about various types of noise included in the input audio signal, a distance between the speech recognition apparatus 200 and a sound source, a signal-to-noise ratio (SNR), or an echo. The pre-processing model may include at least one of a noise model, a distance model, or an echo model.

The acoustic model includes information to determine a match between a speech signal and sound by using monophone units or tri-phone units. For example, probabilities in which the speech signal matches phonemes, respectively, may be calculated based on the acoustic model, and as a result, a phoneme that matches the speech signal may be determined.

The language model includes information for determining with which word a speech signal matches. For example, probabilities in which the speech signal matches a plurality of words, respectively, may be calculated based on the language model, and as a result, a word that matches the speech signal may be determined. In the descriptions below, the speech recognition model will be described while classified to the language model and the acoustic model, however, each of models may be replaced and used. For example, the processor 220 according to the present embodiment may determine a predictive language model related to an utterance predicted based on user information.

The user information may include at least one of information about a characteristic of a user, information about an environment where the user is located, information about a vehicle in which the user is located, information about an electronic device to be controlled by a speech recognition command from the user, information about a destination to which the user is to move, or information input by the user.

For example, the information about a characteristic of the user may include information related to at least one of an age, a gender, an education level, a job, a family status, a nationality, biological information, or a language in use of the user. The information about an environment where the user is located may include information related to at least one of a location of the user, a network environment, a traffic status, a season, a time, weather, or a date. The information about a vehicle in which the user is located may include information related to at least one of a fuel quantity of the vehicle, an available drive distance, maintenance information, fellow passenger information, a drive speed, or whether or not a window is open.

A server or an electronic device connected to the speech recognition apparatus 200 may store information a speech recognition model related to an audio signal predicted to be received in various situations. The speech recognition apparatus 200 may obtain the user information, and may search for, in the server or the electronic device, a speech recognition model predicted based on the user information. The speech recognition apparatus 200 may download or share in real time the speech recognition model from the server or the electronic device.

For example, the server or the electronic device connected to the speech recognition apparatus 200 according to the present embodiment may store information about language models related to each utterance predicted in various situations. The speech recognition apparatus 200 may obtain the user information, and may search for, in the server or the electronic device, a language model related to an utterance predicted based on the user information. The speech recognition apparatus 200 may download or share in real time a predictive language model from the server or the electronic device, the predictive language model being related to an utterance predicted to be uttered by the user.

When the processor 220 receives a user input from the user, when there is a change in the environment where the user is located and/or when a use period of a language model in use is expired, the processor 220 may determine a speech recognition model.

When the speech recognition model includes the predictive language model related to the predicted utterance, the processor 220 according to the present embodiment may determine a domain of the predictive language model, based on the user information. The processor 220 may determine a range of language models included in the domain, based on information about a characteristic of the user which is included in the user information. The processor 220 may determine at least one language model included in the determined range to be the predictive language model.

The processor 220 may determine time to download the speech recognition model, based on a network status. For example, when the speech recognition model includes the predictive language model related to the predicted utterance, the processor 220 may determine the speech recognition model including a language model related to a first point included in a route, based on information about the route the user takes to move to the destination. When the processor 220 predicts that a network status of the speech recognition apparatus 200 is not sufficient at the first point, the processor 220 may control the speech recognition apparatus 200 to download the language model related to the first point before arriving at the first point.

The processor 220 may determine a usage method with respect to a speech recognition model. The processor 220 may determine at least one of a use period of the speech recognition model, a method of processing the speech recognition model after the speech recognition model is used, or reliability of the speech recognition model to be the usage method with respect to the speech recognition model.

The processor 220 may perform speech recognition by using the speech recognition model during the use period of the speech recognition model which is included in the usage method. After the use period of the speech recognition model is expired, the processor 220 may delete or deactivate the speech recognition model, based on the usage method.

For example, when the speech recognition model includes the predictive language model related to the predicted utterance, the processor 220 may determine a predictive language model related to a foreign language used in a region where the user is to be located, based on information about a schedule of the user. Based on the schedule of the user, the processor 220 may determine to activate a predictive language model in a period during which the user is to be located in the region. The processor 220 may control the speech recognition apparatus 200 to output a result of performing translation between the foreign language and a language used by the user, based on the predictive language model.

The processor 220 may perform speech recognition on speech of the user by using the speech recognition model. The processor 220 may perform the speech recognition on the speech of the user by using the speech recognition model based on the usage method. The processor 220 may extract a frequency feature of the speech signal from the input audio signal, and may perform speech recognition by using the acoustic model and the language model. The frequency feature may indicate a distribution of frequency components of an acoustic input which are extracted by analyzing a frequency spectrum of the acoustic input.

The processor 220 may be embodied as hardware and/or software configurations to perform a specific function. For example, the processor 220 may include at least one of a model manager 410 (refer to FIG. 4) to manage language models used in speech recognition, a network status determiner 420 (refer to FIG. 4), or a speech recognizer 430 (refer to FIG. 4) to perform speech recognition.

Functions performed by the processor 220 may be implemented by at least one microprocessor or circuit configurations for the functions, respectively. All or some functions performed by the processor 220 may be implemented by a software module consisting of various programming languages or script languages performed by the processor 220. Referring to FIGS. 2 and 3, the speech recognition apparatus 200 includes one processor 220, but the present embodiment is not limited thereto. The speech recognition apparatus 200 may include a plurality of processors.

The communicator 230 may communicate with at least one of the server or the electronic device in a wired or wireless manner. The communicator 230 may download a speech recognition model from at least one of the server or the electronic device. The communicator 230 may communicate with at least one of the server or the electronic device which perform a speech recognition function. For example, the communicator 230 may transmit an audio signal to the server. The communicator 230 may receive a result of speech recognition performed by the server. The communicator 230 may include a short-range communication module, a wired communication module, a mobile communication module, a broadcasting reception module, or the like.

The communicator 230 may obtain user information from an external electronic device. The communicator 230 may obtain, as the user information, information sensed by the external electronic device.

The output interface 240 may output a result of performing the speech recognition. The output interface 240 may inform the user of the result of performing the speech recognition, or may transmit the result of performing the speech recognition to an external device (e.g., a smartphone, a smart TV, a smart watch, the server, etc.). The output interface 240 may include a speaker or a display for outputting an audio signal, an image signal, or a video signal. For example, the output interface 240 may output a result of performing translation between a foreign language and a language used by the user.

The output interface 240 may perform an operation corresponding to the result of performing the speech recognition. For example, the speech recognition apparatus 200 may determine a function of the speech recognition apparatus 200, the function corresponding to the result of performing the speech recognition, and may output, via the output interface 240, an execution screen in which the function is performed. Alternatively, the speech recognition apparatus 200 may transmit, to an external server, a keyword corresponding to the result of performing the speech recognition, may receive information related to the transmitted keyword from the external server, and may output, via the output interface 240, the information on the display.

FIG. 3 is a block diagram of the speech recognition apparatus, according to an embodiment of the present disclosure.

Referring to FIG. 3, the speech recognition apparatus 200 may further include the memory 250 to store the speech recognition model including at least one of a pre-processing model, an acoustic model, and a language model, the user input interface 260 to receive a user input, or the sensor 270.

The memory 250 may store instructions to be executed by the processor 220 so as to control the speech recognition apparatus 200. The processor 220 may determine a speech recognition model, in consideration of a capacity of the memory 250.

The memory 250 may store the speech recognition model. The memory 250 may include at least one of storage mediums including a flash memory type storage medium, a hard disk type storage medium, a multimedia card micro type storage medium, a card-type memory (e.g., a secure digital (SD) memory, an xD memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disc, or an optical disc.

The user input interface 260 may receive a user input for controlling the speech recognition apparatus 200. The user input interface 260 may have a user input device including, but is not limited to, a touch panel for receiving a user's touch, a button for receiving push manipulation by the user, a wheel for receiving rotation manipulation by the user, a keyboard, and a dome switch.

The sensor 270 may include one or more sensors, and may sense user information related to the user of the speech recognition apparatus 200. Alternatively, the sensor 270 may sense various types of information for determining a circumstance in which the speech recognition apparatus 200 operates. For example, the sensor 270 may sense at least one of information about a characteristic of the user, information about an environment where the user is located, information about a vehicle in which the user is located, information about a destination to which the user is to move, or information input by the user.

For example, the sensor 270 may include at least one of an illuminance sensor, a biosensor, a tilt sensor, a position sensor, a proximity sensor, a magnetic sensor, a gyroscope sensor, a temperature/humidity sensor, an infrared sensor, and a speed/acceleration sensor, or a combination thereof.

Figure 4:
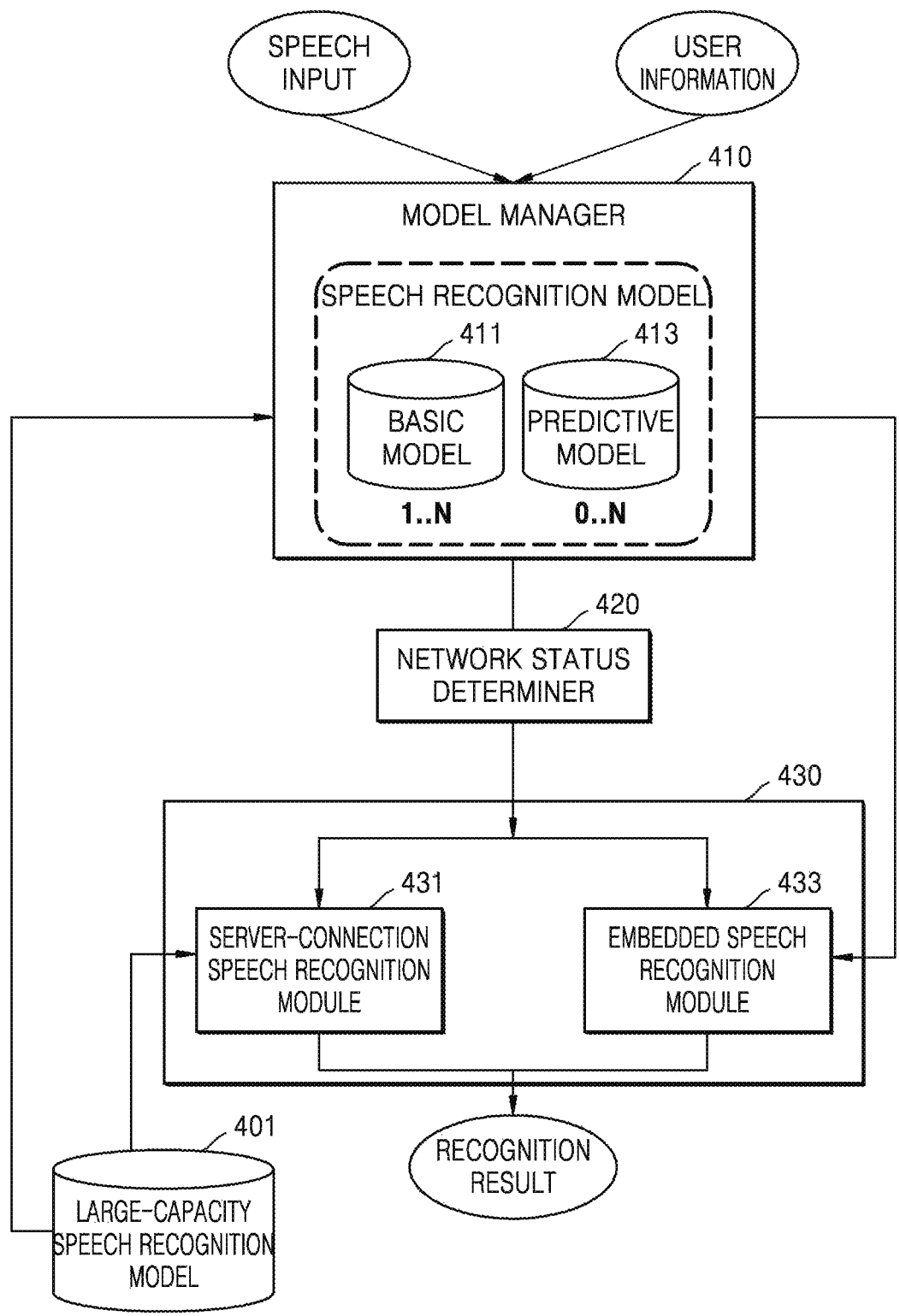
FIG. 4 is a diagram for describing a method performed by the speech recognition apparatus, of performing speech recognition according to an embodiment of the present disclosure.

FIG. 4 is a diagram for describing a method, performed by the speech recognition apparatus 200, of performing speech recognition, according to an embodiment of the present disclosure.

Referring to FIG. 4, the processor 220 of the speech recognition apparatus 200 may include the model manager 410, the network status determiner 420, and the speech recognizer 430.

The network status determiner 420 according to the present embodiment may determine whether the speech recognition apparatus 200 is connected to a network.

According to the present embodiment, if the speech recognition apparatus 200 is connected to the network, the speech recognition apparatus 200 may perform speech recognition on speech input by using a server-connection speech recognition module 431 of the speech recognizer 430. If the speech recognition apparatus 200 is not connected to the network, the speech recognition apparatus 200 may perform the speech recognition on the speech input by using an embedded speech recognition module 433 of the speech recognizer 430.

The model manager 410 may manage speech recognition models used by the embedded speech recognition module 433. The model manager 410 may manage the speech recognition models. The speech recognition models managed by the model manager 410 may include a basic speech recognition model 411 basically used in performing speech recognition, regardless of user information or a circumstance in which the speech recognition apparatus 200 operates. In addition, the speech recognition models managed by the model manager 410 may include a predictive speech recognition model 413 predicted to be used in performing speech recognition, based on the user information. In descriptions below, the basic speech recognition model 411 and the predictive speech recognition model 413 may be classified according to respective embodiments and the respective embodiments may be described, or the basic speech recognition model 411 and the predictive speech recognition model 413 may be collectively called 'speech recognition model' without distinguishing between the basic speech recognition model 411 and the predictive speech recognition model 413, and the respective embodiments may be described. Alternatively, in descriptions below, the basic speech recognition model 411 and the predictive speech recognition model 413 may be classified according to respective embodiments and the respective embodiments may be described, or the basic speech recognition model 411 or the predictive speech recognition model 413 may be called 'speech recognition model' and each embodiment may be described.

The model manager 410 may manage at least one basic speech recognition model 411. The model manager 410 may further manage the predictive speech recognition model 413. The model manager 410 may determine a speech recognition model predicted to be used based on the user information to be predictive speech recognition model 413. For example, the model manager 410 may determine a predictive language model related to an utterance predicted based on the user information. The model manager 410 may determine a usage method of at least one of the basic speech recognition model 411 or the predictive speech recognition model 413.

The embedded speech recognition module 433 may perform speech recognition on speech input by the user by using at least one of the basic speech recognition model 411 or the predictive speech recognition model 413, based on the usage method determined by the model manager 410, and may generate a result of the speech recognition.

When network connection is sufficient, the server-connection speech recognition module 431 may perform speech recognition on the speech input by the user by using a large-capacity speech recognition model 401 stored in a server, and may generate a result of the speech recognition.

When network connection is sufficient, the model manager 410 may update at least one of the basic speech recognition model 411 or the predictive speech recognition model 413, based on the large-capacity speech recognition model 401 stored in the server. For example, the model manager 410 may download at least one speech recognition model stored in the large-capacity speech recognition model 401, thereby generating and storing a new predictive speech recognition model. Alternatively, the model manager 410 may download a newly-updated basic speech recognition model from the large-capacity speech recognition model 401. Alternatively, the model manager 410 may newly classify at least one speech recognition model into the basic speech recognition model 411 and may manage the at least one speech recognition model that was managed as the predictive speech recognition model 413.

As illustrated in FIG. 4, the speech recognition apparatus 200 may pre-download a speech recognition model predicted to be used in performing speech recognition, based on user information. The speech recognition apparatus 200 may perform speech recognition on the speech input by the user by using the pre-downloaded speech recognition model.

For example, the user information may include destination information input by the user. The destination information may include information about a route from a current location to a destination. For example, the user information may include information about a registered personal schedule, information about the destination, a network status at the destination, and vehicle status information including a remaining fuel quantity of a vehicle, an available drive distance based on the remaining fuel quantity, a maintenance history, or the like.

For example, a speech recognition model may include a language model. The speech recognition apparatus 200 may pre-download, from the large-capacity speech recognition model 401 in the server, a predictive language model related to an utterance predicted with respect to a specific destination, based on user-input information including information about a scheduled movement to the specific destination, or information automatically received by the speech recognition apparatus 200. Even if network connection is not sufficient while moving to the specific destination, the speech recognition apparatus 200 may perform the speech recognition by using the pre-downloaded speech recognition model and thus may maintain a high speech recognition rate.

Hereinafter, particular operations performed by the speech recognition apparatus 200 will now be described. Each operation of a method described below may be performed by each configuration in the speech recognition apparatus 200.

Figure 5:
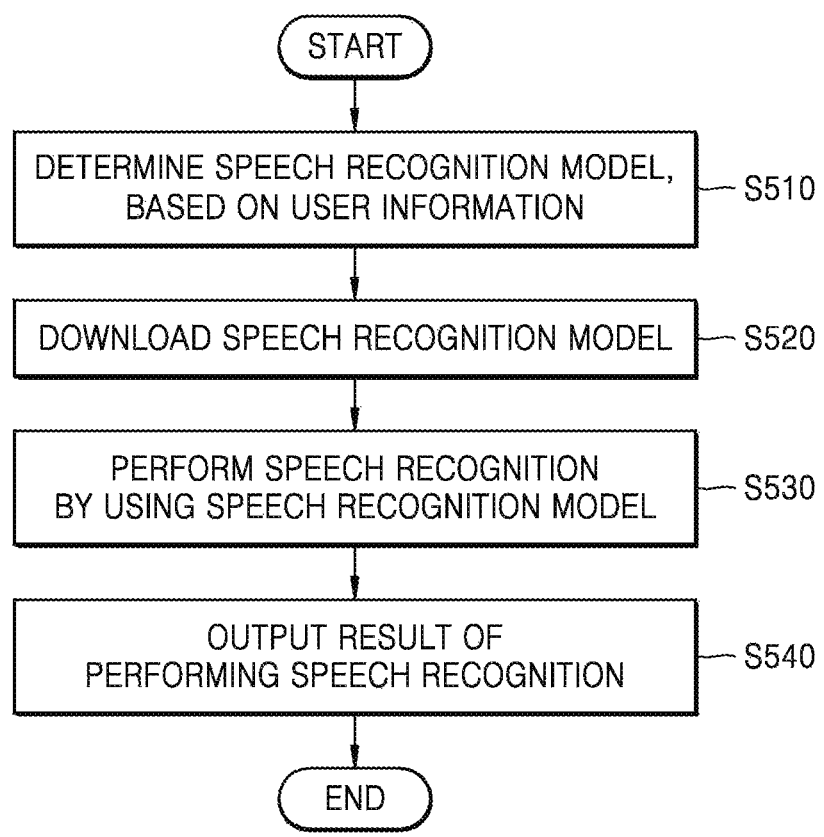
FIG. 5 is a flowchart of a speech recognition method performed by the speech recognition apparatus, according to an embodiment of the present disclosure.

FIG. 5 is a flowchart of a speech recognition method performed by the speech recognition apparatus 200, according to an embodiment of the present disclosure.

Referring to FIG. 5, in operation S510, the speech recognition apparatus 200 may determine a speech recognition model, based on user information. For example, the speech recognition apparatus 200 may determine a speech recognition model predicted to be used in performing speech recognition, based on the user information.

The user information may include at least one of information about a characteristic of a user, information about an environment where the user is located, information about a vehicle in which the user is located, information about a destination to which the user is to move, or information input by the user.

When the speech recognition apparatus 200 receives a user input from the user of the speech recognition apparatus 200, if there is a change in the environment where the user is located and/or if a use period of a speech recognition model in use is expired, the speech recognition apparatus 200 may determine the speech recognition model, based on the user information.

The speech recognition model may include at least one of a pre-processing model, an acoustic model, or a language model.

For example, the speech recognition apparatus 200 may determine the speech recognition model including a predictive language model related to an utterance predicted based on the user information. The speech recognition apparatus 200 may determine a domain of a language model, based on the user information. The speech recognition apparatus 200 may determine a range of language models included in the determined domain, based on information about the characteristic of the user which is included in the user information. The speech recognition apparatus 200 may determine at least one language model included in the determined range to be the predictive language model. The speech recognition apparatus 200 may determine the predictive language model, in consideration of a capacity of the memory 250 in the speech recognition apparatus 200. The speech recognition apparatus 200 may determine language models included in a range that does not exceed the capacity of the memory 250 of the speech recognition apparatus 200 to be the predictive language model.

For example, the speech recognition apparatus 200 may determine a predictive language model including a language model related to a first point included in a route, based on information about the route the user takes to move to the destination.

As another example, the speech recognition apparatus 200 may determine a predictive language model related to a region where the user is to be located, based on user schedule information stored in the speech recognition apparatus 200. The predictive language model related to the region may include at least one of a language model related to a name of the region or a predictive language model related to a foreign language used in the region.

A specific method of determining a predictive language model, based on user information, will be described in detail with reference to FIG. 7.

The speech recognition apparatus 200 may determine a usage method of a speech recognition model.

The usage method of the speech recognition model may include at least one of a use period of the speech recognition model, a method of processing the speech recognition model after the speech recognition model is used, or reliability of the speech recognition model.

The speech recognition apparatus 200 may determine the method of processing the speech recognition model before and after the speech recognition model is used, to be the usage method of the speech recognition model. For example, the speech recognition apparatus 200 may determine to deactivate the predictive language model before the use period and then to activate the predictive language model during the use period. After the use period, the speech recognition apparatus 200 may determine to deactivate or delete the predictive language model.

The speech recognition apparatus 200 may store the determined use method as metadata of the predictive language model.

In operation S520, the speech recognition apparatus 200 may download the speech recognition model.

The speech recognition apparatus 200 may download the speech recognition model from at least one of a server connected to the speech recognition apparatus 200 or an electronic device connected to the speech recognition apparatus 200.

The speech recognition apparatus 200 may determine time to download the speech recognition model, in consideration of a status of network connection. When the speech recognition apparatus 200 predicts that the status of network for communication of the speech recognition apparatus 200 is not sufficient at the first point included in the route the user takes to move to the destination, the speech recognition apparatus 200 may download the speech recognition model related to the first point before arriving at the first point. For example, when the speech recognition model includes the predictive language model related to the predicted utterance, the speech recognition apparatus 200 may determine a predictive language model including a language model related to the first point included in the route, and may download the predictive language model before arriving at the first point.

In operation S530, the speech recognition apparatus 200 may perform speech recognition by using the speech recognition model.

The speech recognition apparatus 200 may detect speech from an input audio signal including an utterance from the user, and may perform speech recognition on the speech.

The speech recognition apparatus 200 may determine a usage method of the speech recognition model and may use the speech recognition model based on the determined usage method, thereby performing the speech recognition. For example, the speech recognition apparatus 200 may perform the speech recognition by using a predictive speech recognition model during a use period of the predictive speech recognition model, the use period being included in the usage method.

After the use period of the predictive speech recognition model is expired, the speech recognition apparatus 200 may delete or deactivate the predictive speech recognition model, based on the usage method.

In operation S540, the speech recognition apparatus 200 may output a result of performing the speech recognition.

The speech recognition apparatus 200 may output the result of the speech recognition performed by an embedded speech recognition module. For example, the result of performing the speech recognition may include a text extracted from a speech recognition command. As another example, the result of performing the speech recognition may correspond to an execution screen in which an operation corresponding to the result of performing the speech recognition is being performed. The speech recognition apparatus 200 may perform the operation corresponding to the result of performing the speech recognition. For example, the speech recognition apparatus 200 may determine a function of the speech recognition apparatus 200 which corresponds to the result of performing the speech recognition, and may output the execution screen in which the function is being performed. Alternatively, the speech recognition apparatus 200 may transmit a keyword corresponding to the result of performing the speech recognition to an external server, may receive information related to the transmitted keyword from the external server, and may output the information to the display.

For example, when the speech recognition model determined based on the user information includes predictive language models, the speech recognition apparatus 200 may output a result of performing translation between a foreign language and a language used by the user, based on a predictive language model related to the foreign language.

After the speech recognition apparatus 200 according to the present embodiment determines a use method of a speech recognition model, the speech recognition apparatus 200 may download the speech recognition model. However, the present disclosure is not limited thereto, and the speech recognition apparatus 200 may determine a use method of a speech recognition model after the speech recognition apparatus 200 downloads the speech recognition model.

The speech recognition apparatus 200 according to the present embodiment may download the speech recognition model as illustrated in FIG. 5, and may update the speech recognition model based on a user's usage history or a user's feedback. In addition, the server may update a stored speech recognition model, based on the user's usage history or the user's feedback. The server may be connected to a plurality of speech recognition apparatuses. The server may update a speech recognition model, based on a usage history or feedback from one user or based on usage histories or feedbacks from a plurality of users.

For example, the server that stores a language model related to Germany may update the language model related to Germany, based on words such as place names, building names, street names, etc. that a first user of a first speech recognition apparatus used while travelling in Germany in May, or feedbacks on speech recognition results. Next, the server may update the language model related to Germany, based on words that a second user of a second speech recognition apparatus used while travelling in Germany in June, or feedbacks on speech recognition results.

Figure 6:
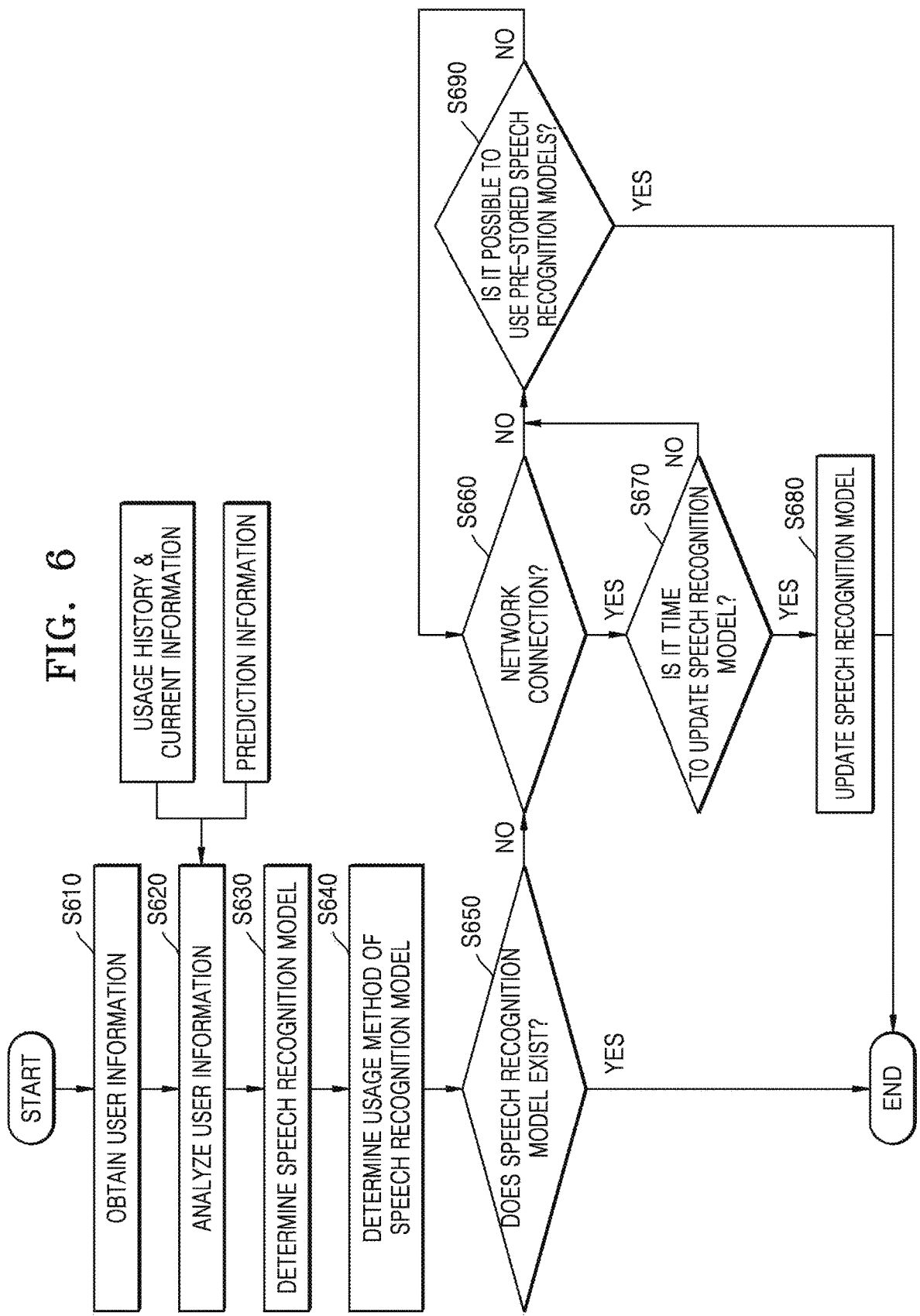
FIG. 6 is a flowchart of a method, performed by the speech recognition apparatus, of managing a speech recognition model, according to an embodiment of the present disclosure.

FIG. 6 is a flowchart of a method, performed by the speech recognition apparatus 200, of managing a speech recognition model, according to an embodiment of the present disclosure. Each of operations illustrated in FIG. 6 may be performed by the model manager 410 or the network status determiner 420 of FIG. 4.

The speech recognition apparatus 200 may always have at least one speech recognition model before the speech recognition apparatus 200 updates a speech recognition model. The speech recognition apparatus 200 may manage at least one of a basic speech recognition model that is basically and always used, a current speech recognition model that is additionally used in a current speech recognition circumstance, or a predictive speech recognition model to be applied to a predicted speech recognition circumstance.

When a use period of a current speech recognition model is expired, a user input for updating a speech recognition model is received, a user input by which a change in a speech recognition circumstance can be predicted is received, and/or an environment in which the speech recognition apparatus 200 operates is changed, the speech recognition apparatus 200 may perform operations illustrated in FIG. 6. For example, a case in which the environment in which the speech recognition apparatus 200 operates is changed may indicate that a location of the speech recognition apparatus 200 is changed or a status of a vehicle connected to the speech recognition apparatus 200 is changed.

In operation S610, the speech recognition apparatus 200 may obtain user information.

For example, the speech recognition apparatus 200 may include one or more sensors, and may obtain a plurality of pieces of user information sensed by the sensors. For example, the sensors included in the speech recognition apparatus 200 may sense information related to a characteristic of a user of the speech recognition apparatus 200 information related to an environment in which the user is located, information related to a vehicle in which the user is located, or the like. For example, the speech recognition apparatus 200 may include at least one of an illuminance sensor, a biosensor, a tilt sensor, a position sensor, a proximity sensor, a magnetic sensor, a gyroscope sensor, a temperature/humidity sensor, an infrared sensor, and a speed/acceleration sensor, or a combination thereof.

As another example, the speech recognition apparatus 200 may obtain user information sensed by an external electronic device. For example, the external electronic device may include at least one of an illuminance sensor, a biosensor, a tilt sensor, a position sensor, a proximity sensor, a magnetic sensor, a gyroscope sensor, a temperature/humidity sensor, an infrared sensor, a speed/acceleration sensor, or a combination thereof.

As another example, the speech recognition apparatus 200 may obtain a user input as user information of the speech recognition apparatus 200. For example, the speech recognition apparatus 200 may obtain, from the user input, user information such as information about a location where the speech recognition apparatus 200 operates, the information related to the characteristic of the user of the speech recognition apparatus 200, or the like.

As another example, the speech recognition apparatus 200 may obtain the user information by communicating with another electronic device. For example, when the speech recognition apparatus 200 is connected to an electronic control device or a central information display of the vehicle via short-range communication, the speech recognition apparatus 200 may obtain, as the user information, the information related to the vehicle in which the user is located.

In operation S620, the speech recognition apparatus 200 may analyze the received user information. The user information may include at least one of a user's usage history, a current location where the speech recognition apparatus 200 operates, time information, or information about a predicted speech recognition environment. For example, the information about a predicted speech recognition environment may include a user input including destination information. For example, the information about a predicted speech recognition environment may include information such as personal schedule registration information, a network status of a destination, and the status of the vehicle which are indirectly received in an automatic manner.

In operation S630, the speech recognition apparatus 200 may determine a speech recognition model, based on a result of the analysis. Operation S630 of FIG. 6 may correspond to operation S510 of FIG. 5. The descriptions with respect to FIG. 5 may be applied to operation S630 of FIG. 6 that corresponds to operation S510 of FIG. 5. Thus, descriptions about a repeated operation are omitted here.

In operation S640, the speech recognition apparatus 200 may determine a usage method of the speech recognition model. The usage method of the speech recognition model may be stored as metadata of the speech recognition model.

The usage method of the speech recognition model may include at least one of a use period of the speech recognition model, a method of processing the speech recognition model after the speech recognition model is used, or reliability of the speech recognition model. The descriptions with respect to operation S510 of FIG. 5 may be applied to a method of determining the usage method of the speech recognition model. Thus, descriptions about a repeated operation are omitted here.

In operation S650, the speech recognition apparatus 200 may determine whether the speech recognition model determined based on the user information is a speech recognition model stored in an embedded memory in the speech recognition apparatus 200. If the determined speech recognition model is not stored in the embedded memory, the speech recognition apparatus 200 may determine whether the speech recognition apparatus 200 is connected to a network (operation S660). If the speech recognition apparatus 200 is connected to the network, the speech recognition apparatus 200 may determine whether it is time to update the speech recognition model (operation S670).

For example, if a schedule of travelling to Germany after 1 year is registered, the speech recognition apparatus 200 may determine a speech recognition model related to Germany. For example, the speech recognition model related to Germany may include a language model for translation between Korean language and German language, an acoustic model according to a characteristic of German language, a language model related to place names in Germany, or the like. However, because a predicted time when the speech recognition model related to Germany is to be used is one year away, the speech recognition apparatus 200 may determine that a current time is not the time to update the speech recognition model.

When a speech recognition model is to be used is within a predetermined period from now, in consideration of a usage method of the speech recognition model, the speech recognition apparatus 200 may determine that it is time to update the speech recognition model.

As another example, when the speech recognition apparatus 200 is connected to a complimentary network, the speech recognition apparatus 200 may determine that it is time to update a speech recognition model. For example, when the speech recognition apparatus 200 is connected to only a fee-based mobile communication network, the speech recognition apparatus 200 may determine that it is not time to update a speech recognition model, and when the speech recognition apparatus 200 can be connected to a Wi-Fi-based network, the speech recognition apparatus 200 may determine that it is time to update the speech recognition model.

In operation S680, when the speech recognition apparatus 200 determines that it is time to update the speech recognition model, the speech recognition apparatus 200 downloads the determined speech recognition model from at least one of a server or an electronic device, thereby updating a pre-stored speech recognition model.

If the speech recognition apparatus 200 is not connected to the network, the speech recognition apparatus 200 may determine whether it is possible to use pre-stored speech recognition models, instead of the determined speech recognition model (operation S690). When the speech recognition apparatus 200 determines that it is not possible to use the pre-stored speech recognition models, instead of the determined speech recognition model, the speech recognition apparatus 200 may wait until network connection is sufficient and may download the determined speech recognition model.

Figure 7:
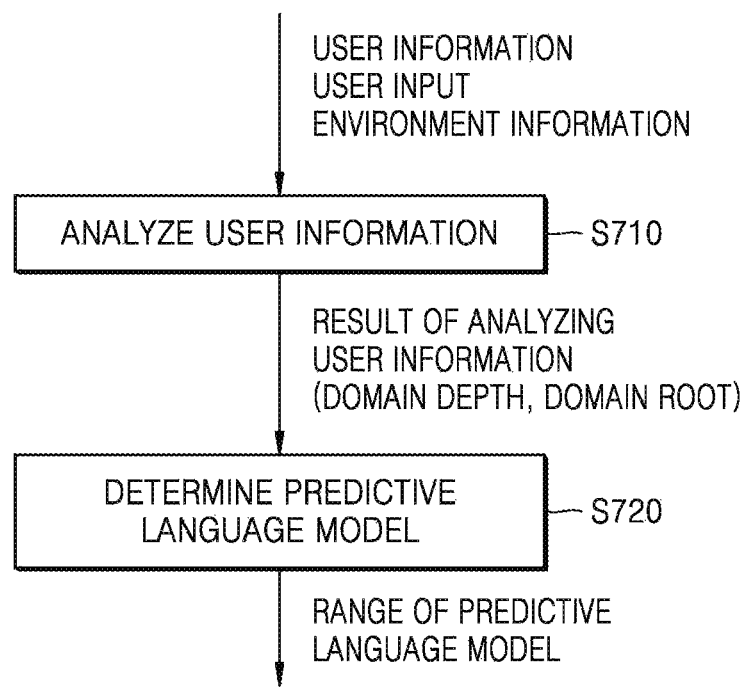
FIG. 7 is a diagram for describing a method, performed by the speech recognition apparatus, of determining a predictive language model, according to an embodiment of the present disclosure.

FIG. 7 is a diagram for describing a method, performed by the speech recognition apparatus 200, of determining a predictive language model included in a speech recognition model determined based on user information, according to an embodiment of the present disclosure.

Operations S710 and S720 of FIG. 7 may correspond to operations S620 and S630 of FIG. 6. Detailed descriptions thereof are omitted.

Referring to FIG. 7, in operation S710, the speech recognition apparatus 200 may analyze received user information. The user information may include pre-stored information about a user, information newly input by the user, and information about a surrounding environment in which the speech recognition apparatus 200 operates. For example, the user information may include information a gender, a hobby, a job, an age, or the like of the user.

The speech recognition apparatus 200 may determine a domain of a predictive language model, based on the user information. The domain of the predictive language model may indicate a range of words attempted to be recognized by the speech recognition apparatus 200 using the predictive language model.

The speech recognition apparatus 200 may determine a range of the domain of the predictive language model based on the user information by a depth and a root. The depth of the domain of the predictive language model may indicate top and bottom ranges of the language models included in the predictive language model when language models have a hierarchical structure. When the language models have a similarity therebetween, the root of the domain of the predictive language model may indicate fields of the language models included in the predictive language model, the fields being included in a range of the determined similarity.

In operation S720, the speech recognition apparatus 200 may determine the language models included in the predictive language model, based on a result of analyzing the user information. The speech recognition apparatus 200 may determine the language models included in the range determined in operation S710 to be the predictive language model. The speech recognition apparatus 200 may determine the language models included in the range determined in operation S710 to be the predictive language model, provided that the language models do not exceed a memory capacity of the speech recognition apparatus 200.

A particular example in which the speech recognition apparatus 200 determines a range of the language models included in the predictive language model, based on the user information, will be described with reference to FIG. 8.

Examples of a speech recognition model determined based on each user information are as below. The speech recognition apparatus 200 may determine the speech recognition model including at least one of a pre-processing model, an acoustic model, or a language model, based on the user information and may use the determined speech recognition model in performing speech recognition.

The speech recognition apparatus 200 may perform the speech recognition by using a language model related to an utterance predicted based on information about a characteristic of the user. The speech recognition apparatus 200 may obtain the information about a characteristic of the user. The speech recognition apparatus 200 may receive a direct input of the information about a characteristic of the user from the user. Alternatively, the speech recognition apparatus 200 may obtain the information about a characteristic of the user from the embedded memory or a user's profile pre-stored in an external server. Alternatively, the speech recognition apparatus 200 may obtain the information about a characteristic of the user from information transmitted from an embedded sensor or an external sensor. Alternatively, the speech recognition apparatus 200 may learn a pattern by which the user uses the speech recognition apparatus 200, and may obtain the information about a characteristic of the user from a result of the learning, the characteristic including a usage history, etc.

For example, the information about a characteristic of the user may include at least one of an age, a gender, an education level, a job, a family status, a nationality, a language in use, biological information, or a usage history of the user. The speech recognition apparatus 200 may replace and use the predictive language model with a basic language model that is basically and always used, the predictive language model having been determined based on the information about a characteristic of the user. For example, the speech recognition apparatus 200 may replace a predictive language model with the basic language model that is basically and always used, the predictive language model having been determined based on information about a user's characteristic that is unlikely to be changed or is predicted to be changed according to a certain standard. For example, the user's characteristic that is unlikely to be changed may include a gender, a nationality, or the like, and the user's characteristic that is predicted to be changed according to a certain standard may include an age.

For example, the speech recognition apparatus 200 may determine and download a predictive language model based on an age or a gender of the user. The speech recognition apparatus 200 may determine a language model to be the predictive language model, the language model including information about words that are mainly used according to an age group or a gender group. For example, if the user is in his/her twenties, the speech recognition apparatus 200 may determine a language model to be the predictive language model, the language model including information about a singer's name who is commonly interested by the twenties. For example, if the user is male, the speech recognition apparatus 200 may determine a language model to be the predictive language model, the language model including information about game-related words. If the user is female, the speech recognition apparatus 200 may determine a language model to be the predictive language model, the language model including information about cosmetic-related words.

As another example, the speech recognition apparatus 200 may determine and download the predictive language model, based on an education level of the user. The speech recognition apparatus 200 may determine a language model to be the predictive language model, the language model including information about words corresponding to a knowledge level that varies according to an education level of each user. For example, if the user is a primary schoolchild, the speech recognition apparatus 200 may exclude a language model including information about a word related to a differential equation from the predictive language model. On the other hand, if the user is a college student who majors mathematics, the speech recognition apparatus 200 may determine a language model to be the predictive language model, the language model including information about a word related to a differential equation.

As another example, the speech recognition apparatus may determine and download the predictive language model, based on a job of the user. The speech recognition apparatus 200 may determine a language model to be the predictive language model, the language model including information about technical terms used by a user according to his/her job. If the user is a cardiologist, the speech recognition apparatus 200 may determine a language model to be the predictive language model, the language model including information about words related to heart diseases.

As another example, the speech recognition apparatus may determine and download the predictive language model, based on a family status of the user. The speech recognition apparatus 200 may determine a language model to be the predictive language model, the language model including information about interests that vary according to the family status. For example, if the user is a parent who raises a child, the speech recognition apparatus 200 may determine a language model to be the predictive language model, the language model including information about childcare-related words.

As another example, the speech recognition apparatus may determine and download the predictive language model, based on at least one of a nationality or a language in use of the user. The speech recognition apparatus 200 may determine a language model to be the predictive language model, the language model including information about interests that vary according to nationalities. For example, if the user is German who uses Korean in Korea, the speech recognition apparatus 200 may determine a language model to be the predictive language model, the language model including information about Korean words related to Germany.

As another example, the speech recognition apparatus may determine and download the predictive language model, based on biological information of the user. The biological information of the user may include information about at least one of a brainwave, a heartbeat, a gaze, or a motion of the user. The speech recognition apparatus 200 may determine a language model to be the predictive language model, the language model being related to an utterance predicted according to a condition of the user.

For example, the speech recognition apparatus 200 may determine whether the user is exercising, based on a status of the user. When the speech recognition apparatus 200 determines that the user is exercising, the speech recognition apparatus 200 may determine a language model to be the predictive language model, the language model including information about exercise-related words.

As another example, the speech recognition apparatus 200 may determine and download a predictive language model, based on a usage history of the user. The speech recognition apparatus 200 may learn at least one of a history of the user who made calls via the speech recognition apparatus 200, an information search history, a history of the user who moved carrying the speech recognition apparatus 200, or a history of using social network services/sites (SNS) via the speech recognition apparatus 200. Based on a result of the learning, the speech recognition apparatus 200 may determine a language model to be the predictive language model, the language model including information about interests of the user. For example, the language model including the information about interests of the user may include information about words related to the interests of the user and words related to content updated on an SNS by the user or a friend of the user.

For example, the speech recognition apparatus 200 may determine a language model to be the predictive language model, the language model including information about words related to frequently-communicated contacts, based on the history of calls. For example, the speech recognition apparatus 200 may determine a language model to be the predictive language model, the language model including information about words related to frequently-searched words, based on the information search history. For example, the speech recognition apparatus 200 may determine a language model to be the predictive language model, the language model including information about words related to movement routes, based on the history of movements.

The speech recognition apparatus 200 may obtain user information from information received various applications executed by the speech recognition apparatus 200, information stored in the speech recognition apparatus 200, information about an electronic device connected to the speech recognition apparatus 200, and information about electronic device positioned around the speech recognition apparatus 200. The speech recognition apparatus 200 may determine a predictive language model related to an utterance predicted based on the obtained user information. The speech recognition apparatus 200 may download the determined predictive language model and may use the predictive language model, thereby performing speech recognition.

In the present embodiment, the speech recognition apparatus 200 may obtain the user information from the information received various applications executed by the speech recognition apparatus 200.

For example, the speech recognition apparatus 200 may pre-download a predictive language model related to an utterance predicted based on user schedule information input via a calendar application provided by the speech recognition apparatus 200. When a schedule of an overseas business trip is registered via the calendar application, the speech recognition apparatus 200 may determine a predictive language model related to a foreign country with respect to the overseas business trip. For example, the determined predictive language model may include a language model for translation between Korean language and a language of the foreign country, a language model related to place names in the foreign country, or the like. In addition, the speech recognition apparatus 200 may determine time to download the predictive language model, based on the length of stay, may determine a use period in which the predictive language model is to be used, and may determine to delete the predictive language model after the predictive language model is expired.

For example, the speech recognition apparatus 200 may pre-download a predictive language model related to an utterance predicted based on information about a destination and a departure which are input via a navigation application provided by the speech recognition apparatus 200. Alternatively, the speech recognition apparatus 200 may receive the information about a destination and a departure from a navigation device connected to the speech recognition apparatus 200, and may pre-download the predictive language model related to an utterance predicted based on the received information. The speech recognition apparatus 200 may determine a predictive language model related to a movement route from the departure to the destination. For example, the predictive language model related to a movement route may include a language model related to names of buildings, street names, or place names on the movement route.

For example, the speech recognition apparatus 200 may pre-download a predictive language model related to an utterance predicted based on the information about interests of the user, the information being input via a personal profile storage function provided by the speech recognition apparatus 200. Alternatively, the speech recognition apparatus 200 may pre-download the predictive language model related to an utterance predicted based on the information about interests of the user, the information being input to a personal profile stored in an external server. When a profile of the user is registered or updated, the speech recognition apparatus 200 may determine the predictive language model related to the interests of the user.

As another example, the speech recognition apparatus 200 may obtain user information from information stored in the speech recognition apparatus 200.

For example, the speech recognition apparatus 200 may pre-download a predictive language model related to an utterance predicted based a memo or a file stored in the speech recognition apparatus 200. The speech recognition apparatus 200 may determine a language model to be the predictive language model, the language model including information about words included in the memo. The speech recognition apparatus 200 may download a predictive language model by determining a language model to be the predictive language model, the language model being related to at least one of music, images, or moving pictures stored in the speech recognition apparatus 200. The speech recognition apparatus 200 may determine a language model to be a predictive language model, the language model including information about words related to a name of the stored file, an attribute of the stored file, or content included in the file.

For example, the speech recognition apparatus 200 may download a predictive language model related to an utterance predicted based contacts included in a phonebook stored in the speech recognition apparatus 200. The speech recognition apparatus 200 may download the predictive language model by determining a language model to be the predictive language model, the language model including information about at least one of a name, a contact, or a tile of one of groups classifying the contacts included in the phonebook.

As another example, the speech recognition apparatus 200 may obtain user information from at least one of information about the electronic device connected to the speech recognition apparatus 200 or information about the electronic device positioned around the speech recognition apparatus 200. For example, the electronic device positioned around the speech recognition apparatus 200 may include at least one of a wearable device, a mobile device, a home appliance, an advertisement device positioned in a public place, or a guide device positioned in a public place.

For example, the speech recognition apparatus 200 may download a predictive language model by determining a language model to the predictive language model, the language model including information about a speech recognition command for controlling at least one of the electronic device connected to the speech recognition apparatus 200 or the electronic device positioned around the speech recognition apparatus 200. For example, the determined predictive language model may include information about words related to a title of content, an attribute of the content, a supportable function, and a supportable operation which are provided by at least one of the electronic device connected to the speech recognition apparatus 200 or the electronic device positioned around the speech recognition apparatus 200. The speech recognition apparatus 200 may exclude a language model from the predictive language model, the language model including information about a speech recognition command related to an electronic device that is not positioned around the speech recognition apparatus 200.

The speech recognition apparatus 200 may perform speech recognition by using a language model related to an utterance predicted based on information about an environment in which the user is located. The speech recognition apparatus 200 may obtain the information about an environment in which the user is located. The speech recognition apparatus 200 may receive, directly from the user, information about a surrounding environment. Alternatively, the speech recognition apparatus 200 may obtain the information about a surrounding environment from information received from an embedded sensor or an external electronic device.

For example, the speech recognition apparatus 200 may determine a predictive language model, based on at least one of a location of the user, weather, a time, a surrounding traffic status, a network status, or surrounding people. The speech recognition apparatus 200 may determine time to download the predictive language model, based on the location of the user. For example, if the speech recognition apparatus 200 is in a vehicle, network connection is available, thus, the speech recognition apparatus 200 may download the predictive language model, but, if the speech recognition apparatus 200 is in an airplane, network connection is unavailable, thus, the speech recognition apparatus 200 may determine that it is impossible to download the predictive language model.

The speech recognition apparatus 200 may determine a predictive language model related to an utterance predicted based on whether the user is in a vehicle. For example, when the user is in the vehicle, the speech recognition apparatus 200 may determine the predictive language model, based on at least one of a status of the vehicle or a fellow passenger who is together with the user in the vehicle.

For example, the speech recognition apparatus 200 may download a predictive language model with respect to searching for a gas station, based on information about a fuel quantity of the vehicle and an available drive distance. The speech recognition apparatus 200 may estimate the available drive distance, based on a current fuel quantity of the vehicle, and may determine a language model to be the predictive language model, the language model including information about words related to a name of a gas station within the available drive distance and a route to the gas station.

For example, the speech recognition apparatus 200 may download a predictive language model by determining the predictive language model based on maintenance information related to the vehicle. When the speech recognition apparatus 200 determines that it is time to do maintenance on the vehicle, the speech recognition apparatus 200 may determine a language model to be the predictive language model, the language model including information about words such as a tire pressure, an engine oil, etc. which are related to vehicle maintenance.

For example, the speech recognition apparatus 200 may download a predictive language model by determining the predictive language model based on information about the fellow passenger who is together with the user in the vehicle. Because an utterance predicted when only the user is in the vehicle is different from an utterance predicted when the fellow passenger is together with the user in the vehicle, the speech recognition apparatus 200 may determine different language models to be the predictive language model. When the fellow passenger is together with the user in the vehicle, the speech recognition apparatus 200 may determine and download a predictive language model based on a relation with the fellow passenger.

For example, the speech recognition apparatus 200 may determine a predictive language model, based on a driving status of the vehicle. The speech recognition apparatus 200 may select and use an acoustic model in speech recognition, the acoustic model being appropriate and having noise reflected thereto, based on at least one of a kind of the vehicle, a driving speed of the vehicle, existence or non-existence of external noise due to whether a window is open or close.

As another example, the speech recognition apparatus 200 may determine a predictive language model related to an utterance predicted based on whether the user is in the inside.

For example, if the user is located in a building, the speech recognition apparatus 200 may determine a predictive language model, based on a structure of the building. The speech recognition apparatus 200 may select an appropriate acoustic model to which a speech feature being input to the speech recognition apparatus 200 has been applied, and may use the acoustic model in speech recognition, based on in which location of the building the user is, e.g., whether the user in an elevator, on stairs, etc.

For example, if the user is located in a building, the speech recognition apparatus 200 may determine a predictive language model, based on a use of the building. Because an utterance predicted when the user is in a restaurant is different from an utterance predicted when the user is in a store, the speech recognition apparatus 200 may determine different language models to be the predictive language model.

For example, if the user is located in the outside, the speech recognition apparatus 200 may determine a language model to be a predictive language model, the language model including information about names of ambient buildings, place names, street names, etc. In addition, if the user is moving in the outside, the speech recognition apparatus 200 may determine a language model to be a predictive language model, the language model including information about names of buildings, place names, street names, or the like on a movement route.

As another example, the speech recognition apparatus 200 may determine a predictive language model related to an utterance predicted based on an ambient traffic status.

For example, if a traffic status is light, the speech recognition apparatus 200 may predict that the user is going to give an utterance related to driving the vehicle. If the traffic status is light, the speech recognition apparatus 200 may download a predictive language model by determining a language model to be the predictive language model, the language model being related to driving the vehicle.

For example, if the traffic status is not light and thus there is a traffic jam, the speech recognition apparatus 200 may predict that the user is going to give an utterance irrelevant to driving the vehicle. If the traffic status is not light, the speech recognition apparatus 200 may download a predictive language model by determining a language model to be the predictive language model, the language model being related to controlling other functions irrelevant to driving the vehicle.

As another example, the speech recognition apparatus 200 may determine a predictive language model related to an utterance predicted based on weather, a time, a season, or the like.

For example, the speech recognition apparatus 200 may determine a predictive language model related to an utterance for controlling air-conditioning or heating, based on the weather. For example, the speech recognition apparatus 200 may determine a language model related to a weather report to be predictive language model. For example, the speech recognition apparatus 200 may determine the language model to be the predictive language model, the language model including information about words predicted to be uttered by the user in relation to the weather. The speech recognition apparatus 200 may determine a language model to be the predictive language model, the language model including information about a cold or food that is frequently searched for by the user when the weather becomes cold.

As another example, the speech recognition apparatus 200 may determine a predictive language model related to an utterance predicted based on relations with ambient people. Because an utterance predicted to be given by the user varies according to the relations with ambient people, the speech recognition apparatus 200 may determine different language models to be the predictive language model.

The speech recognition apparatus 200 may select an appropriate pre-processing model according to an environment in which the speech recognition apparatus 200 operates, and may use the pre-processing model in speech recognition.

The speech recognition apparatus 200 may select the appropriate pre-processing model according to the environment in which the speech recognition apparatus 200 operates and may perform pre-processing on a received input signal. The pre-processing may indicate processing performed, before speech recognition is performed, to extract a speech signal for performing the speech recognition from an input audio signal including various types of noise and the speech signal. For example, the speech recognition apparatus 200 may perform, as the pre-processing, removing noise, improving an SNR, removing an echo, or the like. The pre-processing model may include a noise model, a distance model, an echo model, or the like.

For example, the speech recognition apparatus 200 may select an appropriate noise model according to a type of ambient noise around the speech recognition apparatus 200, and may perform pre-processing on a received input signal. The noise model may indicate a model with respect to static noise, babble noise, impulse noise, or the like.

For example, the speech recognition apparatus 200 may select an appropriate distance model according to a distance in which a speech signal is received, and may perform pre-processing on a received input signal. The distance model may include a long distance model including information about a feature of a speech signal received from a distant source, or a short distance model including information about a feature of a speech signal received from a close source. When the speech signal with a long distance is received, the speech recognition apparatus 200 may select and use a distance model with respect to a speech signal of which SNR is low. When the speech signal with a short distance is received, the speech recognition apparatus 200 may select and use a distance model with respect to a speech signal of which SNR is high.

For example, the speech recognition apparatus 200 may select an appropriate echo model according to a characteristic of an echo, and may perform pre-processing on a received input signal. The echo model may include information about a feature of a speech signal of a case in which the speech signal is the same as a speech signal output from a speaker of the speech recognition apparatus 200 and is input via a microphone of the speech recognition apparatus 200 with time delay therebetween.

As another example, the speech recognition apparatus 200 may select an appropriate acoustic model according to an environment in which the speech recognition apparatus 200 operates, and may use the acoustic model in speech recognition.

For example, the speech recognition apparatus 200 may select the appropriate acoustic model according to a type and level of ambient noise around the speech recognition apparatus 200, and may use the acoustic model in the speech recognition. The acoustic model according to the ambient noise may include an acoustic model including information about a feature of a clear speech signal excluding noise or information about a feature of a speech signal including heavy noise.

As another example, the speech recognition apparatus 200 may determine an acoustic model, based on a characteristic of a user.

For example, the speech recognition apparatus 200 may select an acoustic model including an appropriate pronunciation model according to speaker's pronunciation, and may use the acoustic model in speech recognition. The pronunciation model may include a recognition model appropriate for standard pronunciation or a recognition model appropriate for a characteristic of individual pronunciation.

For example, when the speech recognition apparatus 200 determines that a user is drunken, sleepy, or awake from his/her sleep, the speech recognition apparatus 200 may determine an acoustic model to be a predictive language model, based on a determined state of the user, the acoustic model including information about pronunciation that is incorrectly spoken.

FIG. 8 is a diagram for describing a method, performed by the speech recognition apparatus 200, of determining a range of language models included in a predictive language model, based on user information, according to an embodiment of the present disclosure.

Referring to FIG. 8, when the speech recognition apparatus 200 predicts that the user is to give a professional and serious utterance, based on the user information, the speech recognition apparatus 200 may determine a depth of a domain of a predictive language model to be deep. For example, the speech recognition apparatus 200 may determine a vertical predictive language model that is a predictive language model of which domain depth is deep and domain root is narrow. On the other hand, when the speech recognition apparatus 200 predicts that the user is to give a non-professional utterance, based on the user information, the speech recognition apparatus 200 may determine a depth of a domain of a predictive language model to be shallow. For example, the speech recognition apparatus 200 may determine a horizontal predictive language model that is a predictive language model of domain depth is shallow and domain root is broad.

FIG. 8 illustrates an example of determining, by the speech recognition apparatus 200, a range of language models included in a predictive language model, based on a job of a user when the speech recognition apparatus 200 predicts that the user is to give an utterance related to 'cold'.

If a job of a user 801 is an engineer, the speech recognition apparatus 200 may predict that the user 801 may give a non-professional utterance related to "cold". Thus, the speech recognition apparatus 200 may determine a horizontal predictive language model related to "cold" predicted to be uttered by the user 801. The speech recognition apparatus 200 may determine "disease" including item "cold" to be a root of a domain of the predictive language model, and may determine a depth of the domain to be "2" that is relatively shallow.

The speech recognition apparatus 200 may determine the domain of the predictive language model to include lower-level language models 804 that correspond to the root determined from among language models 803 related to "disease" and correspond to the determined depth "2". The speech recognition apparatus 200 may determine the domain of the predictive language model to include a language model related to "cold" that is firstly included in a lower-level from the root "disease" and to include language models related to "symptoms of cold, causes of diseases, diseased areas, complications" that are included in a lower-level from the item "cold".

If a job of a user 802 is a doctor, the speech recognition apparatus 200 may predict that the user 802 may give a professional and serious utterance related to "cold". Thus, the speech recognition apparatus 200 may determine a vertical predictive language model related to "cold" predicted to be uttered by the user 802. The speech recognition apparatus 200 may determine, based on user information, "disease" that is the same as the horizontal predictive language model to be a root of a domain of the predictive language model, and may determine a depth of the domain to be "6" that is relatively deep.

The speech recognition apparatus 200 may determine the domain of the predictive language model to include lower-level language models 805 that correspond to the root determined from among the language models 803 related to "disease" and correspond to the determined depth "6". The speech recognition apparatus 200 may determine a range of the predictive language model to include the language model related to "cold" that is included in the lower-level from the root "disease", a language model related to "diseased areas" included in a lower-level from the item "cold", a language model related to "symptoms of each diseased area" included in a lower-level from an item "diseased areas", a language model related to "seriousness of symptoms" included in a lower-level from an item "symptoms of each diseased area", a language model related to "names of diseases" included in a lower-level from an item "seriousness of symptoms", and a language model related to "treatments" included in a lower-level from an item "names of diseases".

Figure 9:
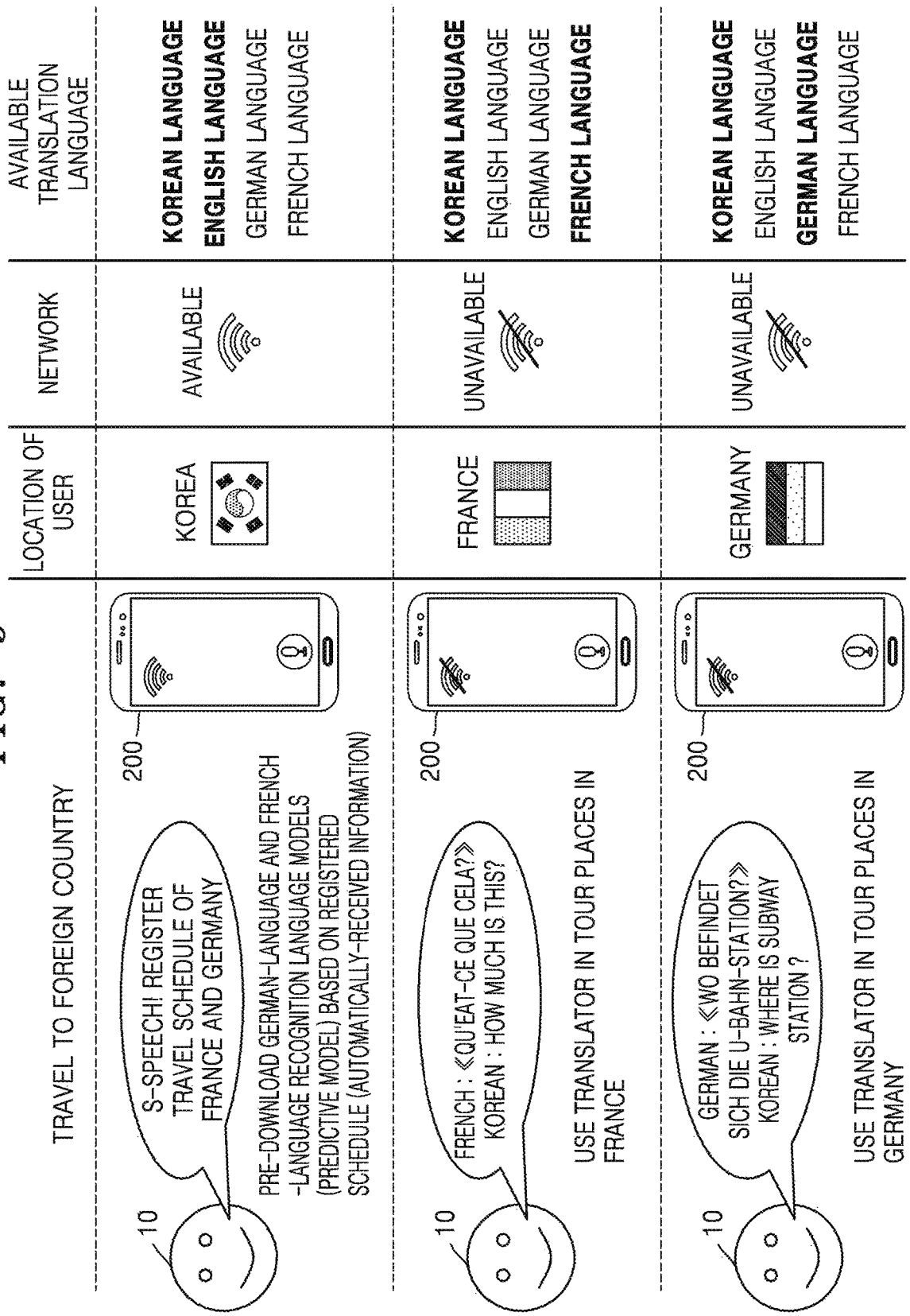
FIG. 9 is a diagram for describing a method, performed by the speech recognition apparatus, of downloading a language model for translation, based on a user schedule, according to an embodiment of the present disclosure.

FIG. 9 is a diagram for describing a method, performed by the speech recognition apparatus 200, of downloading a language model for translation, based on a user schedule, according to an embodiment of the present disclosure.

Descriptions will be provided assuming a case in which the speech recognition apparatus 200 determines and downloads a predictive language model, based on information about the user schedule.

A user 10 of the speech recognition apparatus 200 may register a schedule of travelling to France and Germany in the speech recognition apparatus 200. The speech recognition apparatus 200 may determine a language model to be a predictive language model, the language model being related to a foreign language used in a country to which the user 10 is to travel. For example, with reference to FIG. 9, the speech recognition apparatus 200 may determine a language model related to Germany and France to be the predictive language model, the language model being related to foreign languages used in countries to which the user 10 is to travel.

The speech recognition apparatus 200 may determine a usage method of the predictive language model. The speech recognition apparatus 200 may determine a use period of the predictive language model, based on a travel schedule. The speech recognition apparatus 200 may determine whether the predictive language model is a language model stored in an embedded memory in the speech recognition apparatus 200. When the predictive language model is not stored in the embedded memory, the speech recognition apparatus 200 may determine whether network connection is available. The speech recognition apparatus 200 may determine time to download the predictive language model, based on a status of the network connection.

Referring to FIG. 9, the speech recognition apparatus 200 located in Korea may determine that current network connection is very smooth but network connection may be unavailable in France or Germany. Thus, the speech recognition apparatus 200 may determine that current time is time to update the predictive language model. In addition to a Korean-language recognition language model and an English-language recognition language model that are language models stored as default, the speech recognition apparatus 200 may additionally store a German-language recognition language model and a French-language recognition language model as the predictive language model.

The speech recognition apparatus 200 may determine not to use a predictive language model before a use period, based on the use period of the predictive language model. Before a departure of the user 10 for a travel to Germany or France, the speech recognition apparatus 200 does not need to recognize speech in a German language or speech in a French language. Thus, the speech recognition apparatus 200 may deactivate the predictive language model before the use period, thereby increasing a recognition time with respect to a speech recognition command and enhancing a recognition accuracy. The speech recognition apparatus 200 may recognize speech in English and Korean languages while the user 10 stays in Korea.

With reference to FIG. 9, the speech recognition apparatus 200 that is located in France according to the travel schedule of the user 10 may perform speech recognition by using an embedded speech recognition module because network connection is unavailable. The speech recognition apparatus 200 may perform the speech recognition by using the embedded speech recognition module using a pre-downloaded predictive language model. The speech recognition apparatus 200 may activate the French-language recognition language model, based on a use period of the French-language recognition language model, and may deactivate the English-language recognition language model. While the user 10 stays in France, the speech recognition apparatus 200 may recognize speech in French and Korean languages. The speech recognition apparatus 200 may use a function for translation between French and Korean languages by using the predictive language model.

Next, with reference to FIG. 9, the speech recognition apparatus 200 that is located in Germany according to the travel schedule of the user 10 may perform speech recognition by using the embedded speech recognition module because the network connection is still unavailable. The speech recognition apparatus 200 may perform the speech recognition by using the embedded speech recognition module using the pre-downloaded predictive language model. The speech recognition apparatus 200 may activate the German-language recognition language model, based on a use period of the German-language recognition language model, and may deactivate the French-language recognition language model. While the user 10 stays in Germany, the speech recognition apparatus 200 may recognize speech in German and Korean languages. The speech recognition apparatus 200 may use a function for translation between German and Korean languages by using the predictive language model.

Thus, even if the network connection is unavailable, the speech recognition apparatus may perform speech recognition with high accuracy similar to that of speech recognition performed by using the server-connection speech recognition module 431.

Figure 10:
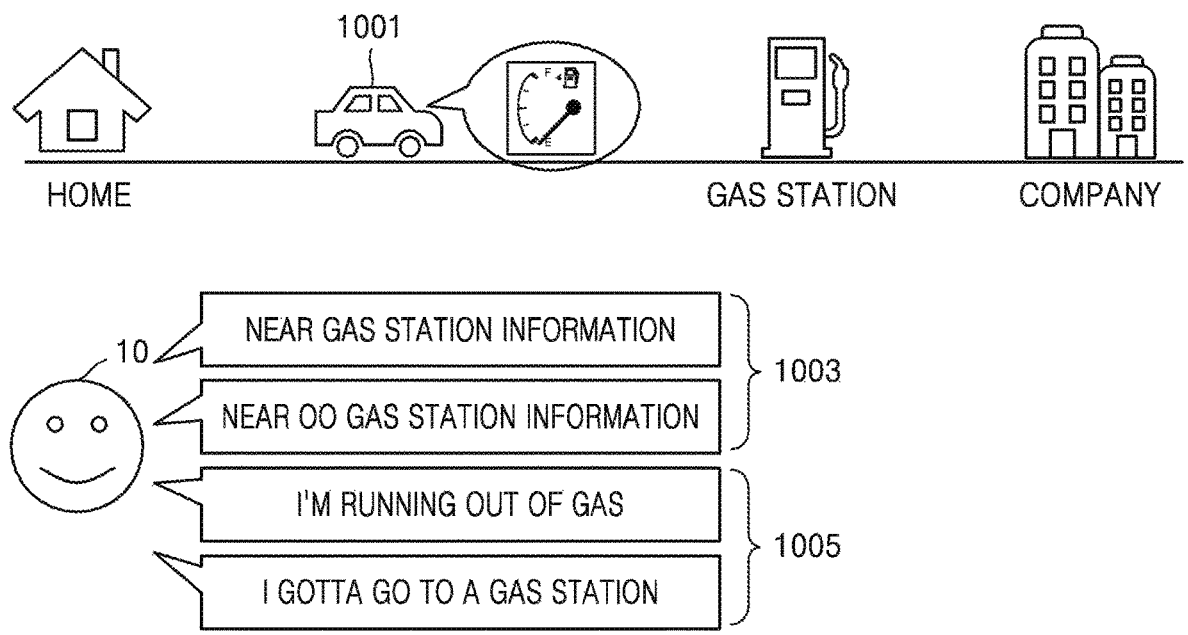
FIG. 10 is a diagram for describing a method, performed by the speech recognition apparatus, of determining a predictive language model based on a status of a vehicle and performing speech recognition, according to an embodiment of the present disclosure.

FIG. 10 is a diagram for describing a method, performed by the speech recognition apparatus 200, of determining a predictive language model based on a status of a vehicle and performing speech recognition, according to an embodiment of the present disclosure.

When the speech recognition apparatus 200 is located in a moving vehicle, a network environment may be become unstable. Thus, whenever a status of network connection becomes unstable, an embedded speech recognition module in the speech recognition apparatus 200 may be frequently used. The embedded speech recognition module may perform speech recognition only on an utterance with limited expressions due to its memory capacity, thus, a speech recognition function with respect to an utterance with natural and various expressions of a user may deteriorate.

The speech recognition apparatus 200 may pre-download a predictive language model, based on vehicle-related information such as a status of a vehicle, a route in which the vehicle moves, or the like. The speech recognition apparatus 200 may pre-download the predictive language model related to various expressions with respect to the vehicle, the expressions being predicted to be uttered by the user. Thus, the user may control the speech recognition apparatus 200 by uttering in a natural manner as if the user has conversation with the speech recognition apparatus 200.

The speech recognition apparatus 200 may be, but is not limited to, a mobile computing apparatus such as a smartphone, navigation, a PDA, or the like which operates by being connected to at least one of an electronic control device or a CID of the vehicle in a wired or wireless manner. The speech recognition apparatus 200 may be included in at least one of the electronic control device or the CID of the vehicle. The speech recognition apparatus 200 may receive information related to the vehicle from various electronic components, sensors, or the CID included in the vehicle.

Referring to FIG. 10 illustrates an example in which fuel of a vehicle 1001 is insufficient while the user 10 goes to work from his/her home by the vehicle 1001. The speech recognition apparatus 200 may obtain information about a fuel shortage in the vehicle 1001 at a departure (i.e., his/her home), and may pre-download a predictive language model about searching for a gas station.

The speech recognition apparatus 200 may obtain information about a destination. For example, the speech recognition apparatus 200 may obtain the information about a destination from a user input indicating movement to the destination (i.e., a company). For example, the user 10 may set the destination to be the company by using a navigation function provided by the speech recognition apparatus 200. Alternatively, the user 10 may input the information about a destination that is the company via a navigation device of the vehicle 1001. As another example, the speech recognition apparatus 200 may learn a pattern of the user 10 who drives the vehicle 1001, so that, when the user 10 is located in the vehicle 1001 when it is usual time to go to work, the speech recognition apparatus 200 may predict that a destination is the company.

The speech recognition apparatus 200 may obtain information about an operational status of the vehicle 1001. For example, with reference to FIG. 10, the speech recognition apparatus 200 may obtain information of a fuel quantity of the vehicle 1001.

The speech recognition apparatus 200 may determine a predictive language model, based on at least one of the information about a destination or the information of a fuel quantity. The speech recognition apparatus 200 may determine whether the fuel quantity of the vehicle 1001 is insufficient. The speech recognition apparatus 200 may determine whether the fuel quantity of the vehicle 1001 is insufficient, based on a fuel quantity used for movement to the destination.

For example, with reference to FIG. 10, the speech recognition apparatus 200 may determine that the fuel quantity of the vehicle 1001 is insufficient, and may determine a predictive language model related to an utterance predicted to be given by the user 10 in regard to the fuel shortage. For example, the speech recognition apparatus 200 may predict that the user 10 is to give an utterance related to searching for a location of a gas station, and may determine a language model to be the predictive language model, the language model being related to searching for gas stations.

The speech recognition apparatus 200 may determine a usage method of the predictive language model related to searching for gas stations. The speech recognition apparatus 200 may determine at least one of a use period of the predictive language model, a method of processing the predictive language model after the predictive language model is used, or reliability of the predictive language model to be the usage method of the predictive language model. For example, the speech recognition apparatus 200 may determine the use period so that the predictive language model can be used only during movement to the destination. Alternatively, the speech recognition apparatus 200 may determine the use period so that the predictive language model can be used until the fuel quantity of the vehicle 1001 becomes sufficient. After the usage method of the predictive language model is expired, the speech recognition apparatus 200 may determine to delete or deactivate the predictive language model.

The speech recognition apparatus 200 may determine whether the predictive language model related to searching for gas stations is a language model stored in an embedded memory in the speech recognition apparatus 200. When the predictive language model is not stored in the embedded memory, the speech recognition apparatus 200 may determine whether network connection is available. Based on a status of the network connection, the speech recognition apparatus 200 may determine time to download the predictive language model.

For example, with reference to FIG. 10, the speech recognition apparatus 200 located in the vehicle 1001 that stops at a departure may predict that, even if current network connection is very smooth, network connection becomes unstable while the vehicle 1001 is in a driving mode. Thus, the speech recognition apparatus 200 may determine to update the predictive language model when the vehicle 1001 stops at the departure. In addition to a basic language model related to limited expressions with respect to searching for gas stations, the speech recognition apparatus 200 may additionally store a language model as the predictive language model, the language model being related to expressions capable of controlling the speech recognition apparatus 200 by uttering as in a natural conversation with respect to searching for gas stations. The speech recognition apparatus 200 may store the language model as the predictive language model, the language model being related to an utterance with natural and various expressions with respect to searching for gas stations.

With reference to FIG. 10, the speech recognition apparatus 200 located in the driving vehicle 1001 has unstable network connection, thus, the speech recognition apparatus 200 may perform speech recognition by using the embedded speech recognition module. The speech recognition apparatus 200 may recognize various expressions of the user 10 who requests searching for gas stations by using the predictive language model. While the vehicle 1001 is in a driving mode, the speech recognition apparatus 200 may perform the speech recognition by using a pre-downloaded predictive language model. Therefore, even if network connection is unavailable, the speech recognition apparatus 200 may perform speech recognition on an utterance with natural and various expressions with high accuracy similar to that of speech recognition performed by using the server-connection speech recognition module 431.

As illustrated in FIG. 10, when a status of network connection becomes unstable so that the embedded speech recognition module is used, a speech recognition apparatus according to the related art can perform speech recognition only on speech recognition commands 1003 with limited expressions such as "near gas station information" or "near OO gas station information" due to a limit in a memory capacity. However, the speech recognition apparatus 200 according to the present embodiment may pre-download and use the predictive language model including various expressions related to searching for gas stations, based on a status of the vehicle 1001. Thus, even if the user 10 utters speech recognition commands 1005 such as "I'm running out of gas" or "I gotta go to a gas station" as in a natural conversation, the speech recognition apparatus 200 according to the present embodiment may recognize the speech recognition commands 1005 as a speech recognition command for requesting searching for gas stations. Thus, the speech recognition apparatus 200 may provide the user 10 with information about near gas stations, based on a result of the speech recognition.

As illustrated in FIG. 10, the speech recognition apparatus 200 may pre-download the predictive language model, thereby performing speech recognition even on a speech recognition command that was uttered by the user 10 in a natural manner as if the user 10 has conversation with the speech recognition apparatus 200.

In order to perform speech recognition on a speech recognition command uttered by a user as in a natural conversation, the speech recognition apparatus 200 according to the present embodiment may use a method of reducing a misrecognition rate with respect to proper nouns. The speech recognition apparatus 200 may use a proper noun list in speech recognition, the proper noun list including information of correct pronunciations and similar pronunciations of proper nouns.

The speech recognition apparatus 200 may extend the proper noun list by including incorrect but similar pronunciations of proper nouns, and words having similar meanings to those of the proper nouns. Alternatively, the speech recognition apparatus 200 may use a proper noun list in speech recognition, the proper noun list being generated and extended by a server.

The speech recognition apparatus 200 may perform speech recognition on various expressions included in the extended proper noun list. Thus, even if the user does not utter a correct name, the speech recognition apparatus 200 may perform the speech recognition according to an intention of the utterance by the user.

For example, when the speech recognition apparatus 200 is scheduled to move to a destination A via a vehicle, the speech recognition apparatus 200 may pre-download a predictive language model including an extended proper noun list including place names on a route to the destination A. Therefore, even if the user does not correctly utter a place name, the speech recognition apparatus 200 may perform speech recognition according to an intention of the utterance by the user.

For example, when a status of network connection becomes unstable so that the embedded speech recognition module is used, a speech recognition apparatus according to the related art can perform speech recognition only on a speech recognition command including a correctly-pronounced exact proper noun such as "Seorak service station" or "Baegun valley of Seoraksan Mountain" due to a limit in a memory capacity. However, the speech recognition apparatus 200 according to the present embodiment may pre-download and use a predictive language model including various expressions related to place names on a route to a destination. Thus, even if the user utters speech recognition commands including an incorrect expression such as "Seoraksan Mountain service station" or "Baekrokdam vally of Seoraksan Mountain" which is not a correct place name, the speech recognition apparatus 200 according to the present embodiment may recognize a speech recognition command related to a correct place name. Thus, the speech recognition apparatus 200 may provide the user with information about "Seorak service station" or "Baegun valley of Seoraksan Mountain", based on a result of the speech recognition.

FIG. 11 is a diagram for describing a method, performed by the speech recognition apparatus 200, of downloading a predictive language model by referring to a status of a network on a movement route, according to an embodiment of the present disclosure.

Descriptions will now be provided assuming an example in which a user 10 of the speech recognition apparatus 200 arrives at Rome from Milan via Bern and Venetia.

Referring to FIG. 11, the speech recognition apparatus 200 may determine a predictive language model based on information about a movement route to a destination. The speech recognition apparatus 200 may determine a language model to be the predictive language model, the language model being related to a city to which the user 10 is to travel. The speech recognition apparatus 200 may determine a language model to be the predictive language model, the language model being related to tour information such as famous restaurants, maps, place names, or the like of the city to which the user 10 is to travel.

The speech recognition apparatus 200 may determine a usage method of the predictive language model. The speech recognition apparatus 200 may determine a use period of the predictive language model, based on a travel schedule. The speech recognition apparatus 200 may determine whether the predictive language model is a language model stored in the embedded memory in the speech recognition apparatus 200. When the predictive language model is not stored in the embedded memory, the speech recognition apparatus 200 may determine whether network connection is available. Based on a status of the network connection, the speech recognition apparatus 200 may determine time to download the predictive language model.

Table 1101 of FIG. 11 illustrates statuses of network connection and statuses of the model manager 410 according to locations of the user 10.

Referring to FIG. 11, the speech recognition apparatus 200 located in Milan may determine that current network connection is very smooth but network connection may be unavailable in Bern, may be available by only 60% in Venetia, and may be unavailable in Rome. Thus, the speech recognition apparatus 200 may determine to update the predictive language model when the speech recognition apparatus 200 is located in Milan and Venetia.

Referring to FIG. 11, because the network connection is very smooth, the speech recognition apparatus 200 located in Milan may perform speech recognition by using the server-connection speech recognition module 431. The model manager 410 of the speech recognition apparatus 200 may activate the server-connection speech recognition module 431 for the speech recognition. The speech recognition apparatus 200 may determine that current network connection is very smooth but network connection may be unavailable in Bern or Rome. The speech recognition apparatus 200 may receive or predict information indicating that the network connection is unavailable in Bern or Rome. Thus, the speech recognition apparatus 200 may determine that the present time is appropriate to update the predictive language model.

The speech recognition apparatus 200 may store a language model related to Bern and a language model related to Rome to be the predictive language model. In this regard, the speech recognition apparatus 200 may download a plurality of language models, based on a priority order. The speech recognition apparatus 200 may download a plurality of language models, based on a capacity of the embedded memory. The speech recognition apparatus 200 may priorly download the language model related to Bern than the language model related to Rome because a usage time of the language model related to Bern comes first. As illustrated in FIG. 11, the speech recognition apparatus 200 may completely (100%) download the language model related to Bern, and may partially (50%) download the language model related to Rome in advance.

Referring to FIG. 11, the speech recognition apparatus 200 located in Bern may perform speech recognition by using the embedded speech recognition module 433 because network connection is unavailable. The model manager 410 of the speech recognition apparatus 200 may activate the embedded speech recognition module 433 for the speech recognition. The speech recognition apparatus 200 may recognize a user speech recognition command with respect to tour information about Bern, based on the pre-downloaded predictive language model. Thus, even if the network connection is unavailable, the speech recognition apparatus 200 may perform the speech recognition with high accuracy similar to that of speech recognition performed by using a speech recognizer of a server.

Next, referring to FIG. 11, because network connection is available, the speech recognition apparatus 200 located in Venetia may perform speech recognition by using the server-connection speech recognition module 431. The model manager 410 of the speech recognition apparatus 200 may activate a server for speech recognition. The speech recognition apparatus 200 may determine that network connection is unavailable in Rome, whereas a possibility of current network connection is about 60%. Thus, the speech recognition apparatus 200 may determine that the present time is appropriate to update a predictive language model. The speech recognition apparatus 200 may store the language model related to Rome as the predictive language model. As illustrated in FIG. 11, the speech recognition apparatus 200 may additionally download the language model related to Rome.

Because network connection is unavailable, the speech recognition apparatus 200 located in Rome may perform speech recognition by using the embedded speech recognition module 433. The model manager 410 of the speech recognition apparatus 200 may activate the embedded speech recognition module 433 for the speech recognition. The speech recognition apparatus 200 may recognize a user speech recognition command with respect to tour information about Rome, based on the pre-downloaded predictive language model. Thus, even if the network connection is unavailable, the speech recognition apparatus 200 may perform the speech recognition with high accuracy similar to that of speech recognition performed by using the server-connection speech recognition module 431.

FIG. 12 is a diagram for describing a method, performed by the speech recognition apparatus 200, of downloading or sharing a language model from or with a peripheral electronic device, according to an embodiment.

The speech recognition apparatus 200 may download the language model stored in the peripheral electronic device or may share the language model with the peripheral electronic device. The speech recognition apparatus 200 may download, from a server, a language model that is not stored in the peripheral electronic device. The feature that the speech recognition apparatus 200 shares the language model with the peripheral electronic device may mean that the speech recognition apparatus 200 performs speech recognition by using the language model, which is stored in the peripheral electronic device, as if the language model is stored in the speech recognition apparatus 200.

Referring to FIG. 12, the speech recognition apparatus 200 may download or share a language model with respect to speech recognition commands from or with peripheral electronic devices, the speech recognition commands being commonly used by the peripheral electronic devices.

FIG. 12 illustrates an example in which the speech recognition apparatus 200 is at least one of a smartphone 1201, navigation 1202, a smartwatch 1203, and a virtual reality camera 1204, or a peripheral electronic device of the speech recognition apparatus 200 is at least another one of the smartphone 1201, the navigation 1202, the smartwatch 1203, and the virtual reality camera 1204. However, the present embodiment is not limited thereto. The speech recognition apparatus 200 may be at least one of an inhouse device such as a home appliance, a mobile device such as a wearable device, or a server.

For example, if the speech recognition apparatus 200 is the smartphone 1201, the smartphone 1201 may download or share a language model related to speech recognition commands 1211 (e.g., a power control speech recognition command such as "Turn on power" or "Turn off power", a cardinal number such as "One, Two, Three", an ordinal number such as "First, Second, Third", a communication control speech recognition command such as "Activate Bluetooth" or "Connect Bluetooth", a mode selection speech recognition command such as "Mode 1" or "Mode 2", a reservation speech recognition command such as "Turn off power in one minute", or the like), which are commonly used by the peripheral electronic devices 1202, 1203, and 1204, from or with the peripheral electronic devices 1202, 1203, and 1204. Thus, the smartphone 1201 may not redundantly store the language model related to the speech recognition commands 1211 which are commonly used by the peripheral electronic devices 1202, 1203, and 1204 but may download or share the language model from or with the peripheral electronic devices 1202, 1203, and 1204 when the smartphone 1201 performs speech recognition.

In addition, if the speech recognition apparatus 200 is the smartphone 1201, the smartphone 1201 may download or share a language model related to speech recognition commands 1213 (e.g., a volume control speech recognition command such as "Volume 1", "Volume 2", "Turn up the volume", or "Turn down the volume", a radio channel selection speech recognition command such as "Reproduce a first radio channel", or the like) from or with the navigation 1202, the speech recognition commands 1213 being commonly used by the smartphone 1201 and the navigation 1202.

In addition, if the speech recognition apparatus 200 is the smartphone 1201, the speech recognition apparatus 200 may download, from the server, language models 1217 that are related to a phone number and message translation and are not stored in the peripheral electronic devices 1202, 1203, and 1204.

As another example, if the speech recognition apparatus 200 is the navigation 1202, the speech recognition apparatus 200 may download, from the server, a language model 1218 that is related to place names, gas station information, a road traffic status, etc., and is not stored in the peripheral electronic devices 1201, 1203, and 1204.

As another example, if the speech recognition apparatus 200 is the smartwatch 1203, the smartwatch 1203 may download or share the language model related to the speech recognition commands 1211 (e.g., a power control speech recognition command such as "Turn on power" or "Turn off power", a cardinal number such as "One, Two, Three", an ordinal number such as "First, Second, Third", a communication control speech recognition command such as "Activate Bluetooth" or "Connect Bluetooth", a mode selection speech recognition command such as "Mode 1" or "Mode 2", a reservation speech recognition command such as "Turn off power in one minute", or the like), which are commonly used by the peripheral electronic devices 1201, 1202, and 1204, from or with the peripheral electronic devices 1201, 1202, and 1204.

In addition, if the speech recognition apparatus 200 is the smartwatch 1203, the smartwatch 1203 may download or share a language model related to speech recognition commands 1215 (e.g., a speech recognition command such as "Change to sleep mode", "Black box mode ON", or the like) from or with the virtual reality camera 1204, the speech recognition commands 1215 being commonly used by the smartwatch 1203 and the virtual reality camera 1204.

In addition, if the speech recognition apparatus 200 is the smartwatch 1203, the speech recognition apparatus 200 may download, from the server, a language model 1219 that is related to health such as a heart rate, blood pressure, an amount of exercise, or the like and is not stored in the peripheral electronic devices 1201, 1202, and 1204.

As another example, if the speech recognition apparatus 200 is the virtual reality camera 1204, the speech recognition apparatus 200 may download, from the server, a language model 1220 that is related to a camera control such as an exposure, a shutter, white balance, or the like and is not stored in the peripheral electronic devices 1201, 1202, and 1203.

The speech recognition apparatus 200 such as the smartwatch 1203 or the virtual reality camera 1204 may operate by being connected to the smartphone 1201. The speech recognition apparatus 200 such as the smartwatch 1203 or is the virtual reality camera 1204 may be connected to the smartphone 1201, thereby receiving and using a user-specialized language model stored in the smartphone 1201. The smartwatch 1203 and the virtual reality camera 1204 may have a limit in their capacity of memory. Thus, the speech recognition apparatus 200 such as the smartwatch 1203 or the virtual reality camera 1204 may be connected to the smartphone 1201, thereby sharing a language model, which is stored in the smartphone 1201, with the smartphone 1201.

The embodiments of the present disclosure can be written as computer programs and can be implemented in general-use digital computers that execute the programs using a non-transitory computer-readable recording medium. In addition, a data structure used in the embodiments of the present disclosure can be written in a non-transitory computer-readable recording medium through various means. The one or more embodiments may be embodied as computer readable code/instructions on a recording medium, e.g., a program module to be executed in computers, which include computer-readable commands. For example, methods that are implemented as software modules or algorithms may be stored as computer readable codes or program instructions executable on a non-transitory computer-readable recording medium.

The non-transitory computer-readable medium may include any recording medium that may be accessed by computers, volatile and non-volatile medium, and detachable and non-detachable medium. Examples of the non-transitory computer-readable medium include, but are not limited to, magnetic storage media (e.g., read-only memory (ROM), floppy disks, hard disks, etc.), optical recording media (e.g., CD-ROMs, or digital versatile discs (DVDs)), etc. In addition, the non-transitory computer-readable medium may include a computer storage medium and a communication medium.

The non-transitory computer-readable recording media can be distributed over network coupled computer systems, and data stored in the distributed recording media, e.g., a program command and code, may be executed by using at least one computer.

The particular implementations shown and described herein are illustrative examples of the present disclosure and are not intended to otherwise limit the scope of the present disclosure in any way. For the sake of brevity, electronic configurations according to the related art, control systems, software and other functional aspects of the systems may not be described.

Throughout the specification, terms such as "unit" and "module" indicate a unit for processing at least one function or operation, wherein the unit and the module may be embodied as hardware or software or embodied by combining hardware and software. The unit and the module may be formed so as to be in an addressable storage medium, or may be implemented by a program executable by a processor.

For example, "unit" or "module" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

While the present disclosure has been shown and described with reference to various embodiments thereof, it will be understood by those skilled in the art that various changes in form and details may be made therein without departing from the spirit and scope as of the present disclosure defined by the appended claims and their equivalents.

What is claimed is:

1. A speech recognition method, performed by a speech recognition apparatus, the speech recognition method comprising:
    determining a speech recognition model, based on user information, the determining of the speech recognition model comprising determining a predictive language model included in the speech recognition model based on language models included in a range, the range being determined based on an utterance predicted to be uttered by a user of the speech recognition apparatus;
    downloading the speech recognition model;
    performing speech recognition, based on the speech recognition model; and
    outputting a result of performing the speech recognition.

2. The speech recognition method of claim 1, wherein the speech recognition model comprises at least one of a preprocessing model, an acoustic model, or a language model.

3. The speech recognition method of claim 1, further comprising obtaining the user information,
    wherein the user information comprises at least one of information about a characteristic of the user, information about an environment in which the user is located, information about a vehicle in which the user is located, information about a destination of the user, or information input by the user.

4. The speech recognition method of claim 1,
    wherein the predictive language model is related to the predicted utterance, and
    wherein the determining of the speech recognition model further comprises:
        determining a domain of a language model, based on the user information;
        determining a range of language models comprised in the domain, based on information about a characteristic of the user which is comprised in the user information; and
        determining at least one language model to be the predictive language model, wherein the range comprises the at least one language model.

5. The speech recognition method of claim 1, wherein the determining of the speech recognition model further comprises determining the speech recognition model by referring to a capacity of a memory in the speech recognition apparatus.

6. The speech recognition method of claim 1, wherein the determining of the speech recognition model further comprises determining the speech recognition model according to at least one of when a user input is received from the user, when there is a change in an environment in which the user is located, or when a use period of the speech recognition model has expired.

7. The speech recognition method of claim 1, wherein the downloading of the speech recognition model comprises downloading the speech recognition model from at least one of a server connected to the speech recognition apparatus or an electronic device connected to the speech recognition apparatus.

8. The speech recognition method of claim 1,
    wherein the speech recognition model comprises the predictive language model related to the predicted utterance,
    wherein the determining of the speech recognition model further comprises determining the predictive language model comprising a language model related to a first point comprised in a route, based on information about the route the user takes to move to a destination, and
    wherein the downloading of the speech recognition model comprises downloading the language model related to the first point before arriving at the first point, based on predicting that a network status of the speech recognition apparatus for communication at the first point will be insufficient.

9. The speech recognition method of claim 1, further comprising determining a usage method of the speech recognition model,
    wherein the performing of the speech recognition comprises performing the speech recognition by using the speech recognition model, based on the usage method.

10. The speech recognition method of claim 1, wherein a usage method of the speech recognition model comprises at least one of a use period of the speech recognition model, a method of processing the speech recognition model after the speech recognition model is used, or reliability of the speech recognition model.

11. The speech recognition method of claim 9,
    wherein the performing of the speech recognition based on the usage method comprises performing the speech recognition by using the speech recognition model, during a use period of the speech recognition model which is comprised in the usage method, and
    wherein the speech recognition method further comprises, after the use period of the speech recognition model is expired, deleting or deactivating the speech recognition model, based on the usage method.

12. The speech recognition method of claim 9,
    wherein the speech recognition model comprises the predictive language model related to the predicted utterance,
    wherein the determining of the speech recognition model further comprises determining the predictive language model related to a foreign language used in a region where the user is to be located, based on information about a schedule of the user which is stored in the speech recognition apparatus,
    wherein the determining of the usage method of the speech recognition model comprises determining to activate the predictive language model in a period during which the user is to be located in the region, based on the schedule of the user, and wherein the outputting of the result of performing the speech recognition comprises outputting a result of performing translation between the foreign language and a language used by the user, based on the predictive language model.

13. The speech recognition method of claim 1, wherein a depth indicates top and bottom ranges of language models included in the predictive language model when the language models have a hierarchical structure, and wherein a root indicates fields of the language models included in the predictive language model when the language models have a similarity therebetween.

14. A speech recognition apparatus comprising:

a receiver configured to receive speech of a user of the speech recognition apparatus;

at least one processor configured to:
  determine a speech recognition model, based on user information, the determining of the speech recognition model comprising determining a predictive language model included in the speech recognition model based on language models included in a range, the range being determined based on an utterance predicted to be uttered by the user, and
  perform speech recognition on the speech of the user, based on the speech recognition model;

a communicator configured to download the speech recognition model; and an output interface configured to output a result of performing the speech recognition.

15. The speech recognition apparatus of claim 14, wherein the speech recognition model comprises at least one of a pre-processing model, an acoustic model, or a language model.

16. The speech recognition apparatus of claim 14, wherein the at least one processor is further configured to obtain the user information, and wherein the user information comprises at least one of information about a characteristic of the user, information about an environment in which the user is located, information about a vehicle in which the user is located, information about a destination of the user, or information input by the user.

17. The speech recognition apparatus of claim 14, wherein the speech recognition model comprises the predictive language model related to the predicted utterance, and wherein, when the speech recognition model is determined, the at least one processor is further configured to:
  determine a domain of a language model, based on the user information,
  determine a range of language models comprised in the domain, based on information about a characteristic of the user which is comprised in the user information, and
  determine at least one language model to be the predictive language model, wherein the range comprises the at least one language model.

18. The speech recognition apparatus of claim 14, wherein the speech recognition model comprises the predictive language model related to the predicted utterance, and wherein, when the speech recognition model is determined, the at least one processor is further configured to:
  determine the predictive language model comprising a language model related to a first point comprised in a route, based on information about the route the user takes to move to a destination, and
  control the communicator to download the language model related to the first point before arriving at the first point, based on predicting that a network status of the speech recognition apparatus at the first point will be insufficient.

19. The speech recognition apparatus of claim 14, wherein the at least one processor is further configured to:
  determine a usage method of the speech recognition model, and
  perform the speech recognition by using the speech recognition model, based on the usage method, thereby performing the speech recognition on the speech of the user, and wherein the usage method of the speech recognition model comprises at least one of a use period of the speech recognition model, a method of processing the speech recognition model after the speech recognition model is used, or reliability of the speech recognition model.

20. The speech recognition apparatus of claim 19, wherein, when the at least one processor performs the speech recognition by using the speech recognition model based on the usage method, the at least one processor is further configured to:
  perform the speech recognition by using the speech recognition model, during a use period of the speech recognition model comprised in the usage method, and
  after the use period of the speech recognition model is expired, delete or deactivate the speech recognition model, based on the usage method.

21. A non-transitory computer-readable recording medium having recorded thereon one or more programs comprising instructions that, when executed by a processor of an electronic apparatus, causes the electronic apparatus to:
  determine a speech recognition model, based on user information, the determining of the speech recognition model comprising determining a predictive language model included in the speech recognition model based on language models included in a range, the range being determined based on an utterance predicted to be uttered by a user of the electronic apparatus;
  download the speech recognition model;
  perform speech recognition, based on the speech recognition model; and
  output a result of performing the speech recognition.

* * * * *